US012701233B2

(12) United States Patent
Jang

(10) Patent No.: US 12,701,233 B2
(45) Date of Patent: Aug. 4, 2026

(54) IMAGE ENCODING/DECODING METHOD AND DEVICE, AND RECORDING MEDIUM ON WHICH BITSTREAM IS STORED

(71) Applicant: LG Electronics Inc., Seoul (KR)

(72) Inventor: Hyeongmoon Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/725,528

(22) PCT Filed: Dec. 29, 2022

(86) PCT No.: PCT/KR2022/021590
§ 371 (c)(1),
(2) Date: Jun. 28, 2024

(87) PCT Pub. No.: WO2023/128649
PCT Pub. Date: Jul. 6, 2023

(65) Prior Publication Data
US 2025/0071282 A1 Feb. 27, 2025

(30) Foreign Application Priority Data

Dec. 29, 2021 (KR) ........................ 10-2021-0190938

(51) Int. Cl.
*H04N 19/105* (2014.01)
*H04N 19/132* (2014.01)
*H04N 19/176* (2014.01)
*H04N 19/46* (2014.01)

(52) U.S. Cl.
CPC ......... *H04N 19/132* (2014.11); *H04N 19/105* (2014.11); *H04N 19/176* (2014.11); *H04N 19/46* (2014.11)

(58) Field of Classification Search
CPC .. H04N 19/132; H04N 19/105; H04N 19/176; H04N 19/46
USPC ...................................................... 375/240.02
See application file for complete search history.

(56) References Cited

U.S. PATENT DOCUMENTS

| | | | |
|---|---|---|---|
| 2017/0374369 A1* | 12/2017 | Chuang ................... | H04N 19/70 |
| 2024/0244222 A1* | 7/2024 | Deng .................... | H04N 19/184 |
| 2025/0039362 A1* | 1/2025 | Deng .................... | H04N 19/176 |
| 2025/0247557 A1* | 7/2025 | Ma ....................... | H04N 19/593 |

(Continued)

FOREIGN PATENT DOCUMENTS

| | | |
|---|---|---|
| KR | 10-2018-0040824 | 4/2018 |
| KR | 10-2018-0084662 | 7/2018 |

(Continued)

OTHER PUBLICATIONS

International Search Report and Written Opinion in International Appln. No. PCT/KR2022/021590, mailed on Apr. 11, 2023, 10 pages (with partial English translation).

*Primary Examiner* — Albert Kir
(74) *Attorney, Agent, or Firm* — Fish & Richardson P.C.

(57) ABSTRACT
An image decoding/encoding method and device according to the present disclosure enable: an intra prediction mode of the current block to be determined on the basis of whether the intra prediction mode of the current block is derived on the basis of a cost of a template area adjacent to the current block; a reference sample of the current block to be determined; and a prediction sample of the current block to be generated on the basis of the intra prediction mode and the reference sample.

5 Claims, 8 Drawing Sheets

(56)          References Cited

U.S. PATENT DOCUMENTS

| | | | | |
|---|---|---|---|---|
| 2025/0337902 A1* | 10/2025 | Wang | ..................... | H04N 19/11 |
| 2025/0365405 A1* | 11/2025 | Chen | ..................... | H04N 19/14 |

FOREIGN PATENT DOCUMENTS

| | | | | |
|---|---|---|---|---|
| KR | 10-2020-0020730 | 2/2020 | | |
| KR | 10-2021-0021591 | 2/2021 | | |
| KR | 10-2317682 | 10/2021 | | |
| WO | WO-2019007490 A1* | 1/2019 | .......... | H04N 19/176 |
| WO | WO-2023014164 A1* | 2/2023 | .......... | H04N 19/159 |
| WO | WO-2023070505 A1* | 5/2023 | .......... | H04N 19/593 |

* cited by examiner

FIG. 3

IMAGE ENCODING/DECODING METHOD AND DEVICE, AND RECORDING MEDIUM ON WHICH BITSTREAM IS STORED

CROSS-REFERENCE TO RELATED APPLICATIONS

This application is a National Stage application under 35 U.S.C. § 371 of International Application No. PCT/KR2022/021590, filed on Dec. 29, 2022, which claims the benefit of Korean Application No. 10-2021-0190938, filed on Dec. 29, 2021. The disclosures of the prior applications are incorporated by reference in their entirety.

TECHNICAL FIELD

The present disclosure relates to an image encoding/decoding method and apparatus, and a recording medium storing a bitstream.

BACKGROUND

Recently, the demand for high-resolution and high-quality images such as HD (High Definition) images and UHD (Ultra High Definition) images has been increasing in various application fields, and accordingly, highly efficient image compression technologies are being discussed.

There are a variety of technologies such as inter-prediction technology that predicts a pixel value included in a current picture from a picture before or after a current picture with video compression technology, intra-prediction technology that predicts a pixel value included in a current picture by using pixel information in a current picture, entropy coding technology that allocates a short sign to a value with high appearance frequency and a long sign to a value with low appearance frequency, etc. and these image compression technologies may be used to effectively compress image data and transmit or store it.

SUMMARY

The present disclosure seeks to provide a method and a device for deriving an intra prediction mode through a template region-based derivation method.

The present disclosure seeks to provide a method and a device for signaling a flag for adaptively using a template region-based derivation method.

The present disclosure seeks to provide a method and a device for deriving/setting an intra prediction mode based on a flag for adaptively using a template region-based derivation method.

The present disclosure seeks to provide a method and a device for setting an initial intra prediction mode and updating it in a template region-based derivation method.

An image decoding method and device according to the present disclosure may derive an intra prediction mode of the current block based on a flag of a current block, determine a reference sample of the current block, and based on the intra prediction mode and the reference sample, generate a prediction sample of the current block. Here, the flag may indicate whether an intra prediction mode of the current block is derived based on a cost of a template region adjacent to the current block.

In an image decoding method and device according to the present disclosure, the flag may be signaled from a bitstream based on whether a template region of the current block is available.

In an image decoding method and device according to the present disclosure, when a template region of the current block is available, the flag may be signaled from the bitstream, and when a template region of the current block is not available, the flag may not be signaled from the bitstream, and the flag may be driven to 0.

In an image decoding method and device according to the present disclosure, when a template region of the current block is available, the flag may be signaled from the bitstream, and when a template region of the current block is not available, the flag may not be signaled from the bitstream, and the flag may be driven to 1.

In an image decoding method and device according to the present disclosure, when the flag is derived to 1, an intra prediction mode of the current block may be set to a planar mode.

In an image decoding method and device according to the present disclosure, when the flag is derived to 1, an intra prediction mode of the current block may be set to a DC mode.

In an image decoding method and device according to the present disclosure, when the flag is 1, an intra prediction mode of the current block may be determined based on a cost calculated from the template region, and when the flag is 0, an intra prediction mode of the current block may be derived based on intra prediction mode information of the current block.

In an image decoding method and device according to the present disclosure, when the flag is 1, an initial intra prediction mode of the current block may be set to a DC mode.

In an image decoding method and device according to the present disclosure, an initial intra prediction mode of the current block may be updated based on a cost for one or more intra prediction modes available for the current block.

In an image decoding method and device according to the present disclosure, the flag may be signaled from a bitstream regardless of whether a template region of the current block is available.

An image encoding method and device according to the present disclosure may determine whether an intra prediction mode of a current block is determined based on a cost of a template region adjacent to the current block, based on the determination result, determine an intra prediction mode of the current block, determine a reference sample of the current block, and based on the intra prediction mode and the reference sample, generate a prediction sample of the current block. Here, a flag indicating whether an intra prediction mode of the current block is determined based on a cost of the template region may be encoded into a bitstream.

A computer-readable digital storage medium storing encoded video/image information that causes performing the image decoding method by a decoding apparatus according to the present disclosure is provided.

A computer-readable digital storage medium storing video/image information generated according to the image encoding method according to the present disclosure is provided.

A method and a device for transmitting video/image information generated according to an image encoding method according to the present disclosure are provided.

According to the present disclosure, a cost may be calculated from a predetermined template region in terms of an encoder/a decoder, and an optimal intra prediction mode may be derived based thereon.

According to the present disclosure, unnecessary signaling/encoding of a flag may be removed by limiting a signaling/encoding condition of a flag for adaptively using a template region-based derivation method.

The present disclosure may remove redundancy with a MPM-based derivation method by deriving/setting an intra prediction mode based on a flag for adaptively using a template region-based derivation method.

BRIEF DESCRIPTION OF THE DRAWINGS

FIG. 3 shows a schematic block diagram of a decoding apparatus to which an embodiment of the present disclosure is applicable and decoding of video/image signals is performed.

DETAILED DESCRIPTION

Figure 1:
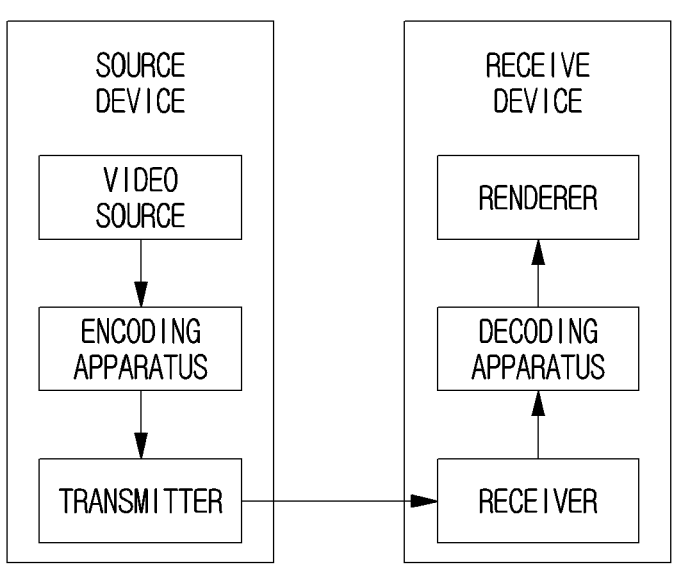
FIG. 1 shows a video/image coding system according to the present disclosure.

Since the present disclosure may make various changes and have several embodiments, specific embodiments will be illustrated in a drawing and described in detail in a detailed description. However, it is not intended to limit the present disclosure to a specific embodiment, and should be understood to include all changes, equivalents and substitutes included in the spirit and technical scope of the present disclosure. While describing each drawing, similar reference numerals are used for similar components.

A term such as first, second, etc. may be used to describe various components, but the components should not be limited by the terms. The terms are used only to distinguish one component from other components. For example, a first component may be referred to as a second component without departing from the scope of a right of the present disclosure, and similarly, a second component may also be referred to as a first component. A term of and/or includes any of a plurality of related stated items or a combination of a plurality of related stated items.

When a component is referred to as "being connected" or "being linked" to another component, it should be understood that it may be directly connected or linked to another component, but another component may exist in the middle. On the other hand, when a component is referred to as "being directly connected" or "being directly linked" to another component, it should be understood that there is no another component in the middle.

A term used in this application is just used to describe a specific embodiment, and is not intended to limit the present disclosure. Singular expressions include plural expressions unless the context clearly dictates otherwise. In this application, it should be understood that a term such as "include" or "have", etc. is intended to designate the presence of features, numbers, steps, operations, components, parts or combinations thereof described in the specification, but does not exclude in advance the possibility of presence or addition of one or more other features, numbers, steps, operations, components, parts or combinations thereof.

The present disclosure relates to video/image coding. For example, a method/an embodiment disclosed herein may be applied to a method disclosed in the versatile video coding (VVC) standard. In addition, a method/an embodiment disclosed herein may be applied to a method disclosed in the essential video coding (EVC) standard, the AOMedia Video 1 (AV1) standard, the 2nd generation of audio video coding standard (AVS2) or the next-generation video/image coding standard (ex.H.267 or H.268, etc.).

This specification proposes various embodiments of video/image coding, and unless otherwise specified, the embodiments may be performed in combination with each other.

Herein, a video may refer to a set of a series of images over time. A picture generally refers to a unit representing one image in a specific time period, and a slice/a tile is a unit that forms part of a picture in coding. A slice/a tile may include at least one coding tree unit (CTU). One picture may consist of at least one slice/tile. One tile is a rectangular region composed of a plurality of CTUs within a specific tile column and a specific tile row of one picture. A tile column is a rectangular region of CTUs having the same height as that of a picture and a width designated by a syntax requirement of a picture parameter set. A tile row is a rectangular region of CTUs having a height designated by a picture parameter set and the same width as that of a picture. CTUs within one tile may be arranged consecutively according to CTU raster scan, while tiles within one picture may be arranged consecutively according to raster scan of a tile. One slice may include an integer number of complete tiles or an integer number of consecutive complete CTU rows within a tile of a picture that may be included exclusively in a single NAL unit. Meanwhile, one picture may be divided into at least two sub-pictures. A sub-picture may be a rectangular region of at least one slice within a picture.

A pixel, a pixel or a pel may refer to the minimum unit that constitutes one picture (or image). In addition, 'sample' may be used as a term corresponding to a pixel. A sample may generally represent a pixel or a pixel value, and may represent only a pixel/a pixel value of a luma component, or only a pixel/a pixel value of a chroma component.

A unit may represent a basic unit of image processing. A unit may include at least one of a specific region of a picture and information related to a corresponding region. One unit may include one luma block and two chroma (ex. cb, cr) blocks. In some cases, a unit may be used interchangeably with a term such as a block or an region, etc. In a general case, a M×N block may include a set (or an array) of transform coefficients or samples (or sample arrays) consisting of M columns and N rows.

Herein, "A or B" may refer to "only A", "only B" or "both A and B." In other words, herein, "A or B" may be interpreted as "A and/or B." For example, herein, "A, B or C" may refer to "only A", "only B", "only C" or "any combination of A, B and C)".

A slash (/) or a comma used herein may refer to "and/or." For example, "A/B" may refer to "A and/or B." Accordingly, "A/B" may refer to "only A", "only B" or "both A and B." For example, "A, B, C" may refer to "A, B, or C".

Herein, "at least one of A and B" may refer to "only A", "only B" or "both A and B". In addition, herein, an expression such as "at least one of A or B" or "at least one of A and/or B" may be interpreted in the same way as "at least one of A and B".

In addition, herein, "at least one of A, B and C" may refer to "only A", "only B", "only C", or "any combination of A, B and C". In addition, "at least one of A, B or C" or "at least one of A, B and/or C" may refer to "at least one of A, B and C".

In addition, a parenthesis used herein may refer to "for example." Specifically, when indicated as "prediction (intra prediction)", "intra prediction" may be proposed as an example of "prediction". In other words, "prediction" herein is not limited to "intra prediction" and "intra prediction" may be proposed as an example of "prediction." In addition, even when indicated as "prediction (i.e., intra prediction)", "intra prediction" may be proposed as an example of "prediction."

Herein, a technical feature described individually in one drawing may be implemented individually or simultaneously.

FIG. 1 shows a video/image coding system according to the present disclosure.

Referring to FIG. 1, a video/image coding system may include a first device (a source device) and a second device (a receiving device).

A source device may transmit encoded video/image information or data in a form of a file or streaming to a receiving device through a digital storage medium or a network. The source device may include a video source, an encoding apparatus and a transmission unit. The receiving device may include a reception unit, a decoding apparatus and a renderer. The encoding apparatus may be referred to as a video/image encoding apparatus and the decoding apparatus may be referred to as a video/image decoding apparatus. A transmitter may be included in an encoding apparatus. A receiver may be included in a decoding apparatus. A renderer may include a display unit, and a display unit may be composed of a separate device or an external component.

A video source may acquire a video/an image through a process of capturing, synthesizing or generating a video/an image. A video source may include a device of capturing a video/an image and a device of generating a video/an image. A device of capturing a video/an image may include at least one camera, a video/image archive including previously captured videos/images, etc. A device of generating a video/an image may include a computer, a tablet, a smartphone, etc. and may (electronically) generate a video/an image. For example, a virtual video/image may be generated through a computer, etc., and in this case, a process of capturing a video/an image may be replaced by a process of generating related data.

An encoding apparatus may encode an input video/image. An encoding apparatus may perform a series of procedures such as prediction, transform, quantization, etc. for compression and coding efficiency. Encoded data (encoded video/image information) may be output in a form of a bitstream.

A transmission unit may transmit encoded video/image information or data output in a form of a bitstream to a reception unit of a receiving device through a digital storage medium or a network in a form of a file or streaming. A digital storage medium may include various storage media such as USB, SD, CD, DVD, Blu-ray, HDD, SSD, etc. A transmission unit may include an element for generating a media file through a predetermined file format and may include an element for transmission through a broadcasting/communication network. A reception unit may receive/extract the bitstream and transmit it to a decoding apparatus.

A decoding apparatus may decode a video/an image by performing a series of procedures such as dequantization, inverse transform, prediction, etc. corresponding to an operation of an encoding apparatus.

A renderer may render a decoded video/image. A rendered video/image may be displayed through a display unit.

Figure 2:
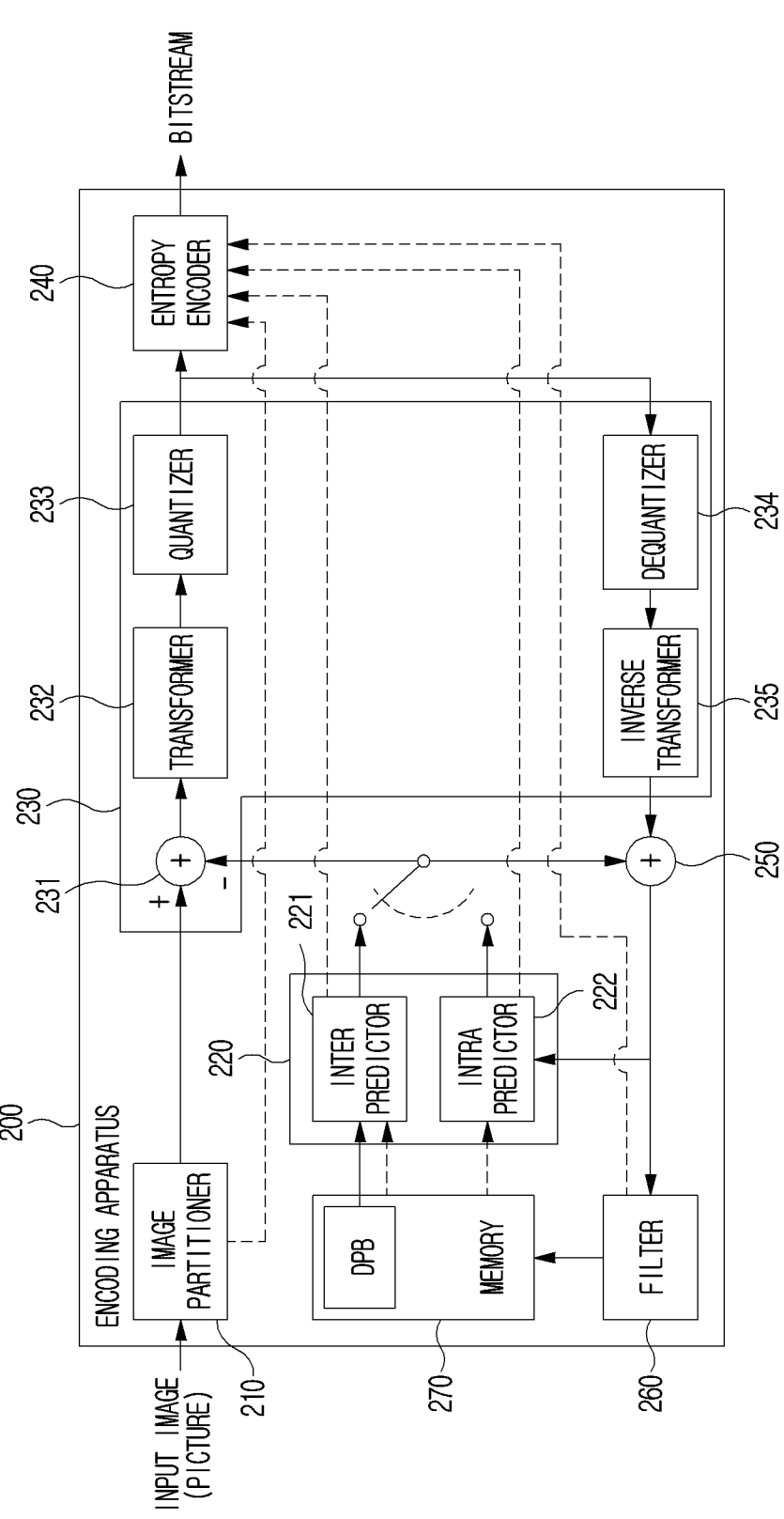
FIG. 2 shows a schematic block diagram of an encoding apparatus to which an embodiment of the present disclosure is applicable and encoding of video/image signals is performed.

FIG. 2 shows a schematic block diagram of an encoding apparatus to which an embodiment of the present disclosure may be applied and encoding of a video/image signal is performed.

Referring to FIG. 2, an encoding apparatus 200 may be composed of an image partitioner 210, a predictor 220, a residual processor 230, an entropy encoder 240, an adder 250, a filter 260 and a memory 270. A predictor 220 may include an inter predictor 221 and an intra predictor 222. A residual processor 230 may include a transformer 232, a quantizer 233, a dequantizer 234 and an inverse transformer 235. A residual processor 230 may further include a subtractor 231. An adder 250 may be referred to as a reconstructor or a reconstructed block generator. The above-described image partitioner 210, predictor 220, residual processor 230, entropy encoder 240, adder 250 and filter 260 may be configured by at least one hardware component (e.g., an encoder chipset or a processor) according to an embodiment. In addition, a memory 270 may include a decoded picture buffer (DPB) and may be configured by a digital storage medium. The hardware component may further include a memory 270 as an internal/external component.

An image partitioner 210 may partition an input image (or picture, frame) input to an encoding apparatus 200 into at least one processing unit. As an example, the processing unit may be referred to as a coding unit (CU). In this case, a coding unit may be partitioned recursively according to a quad-tree binary-tree ternary-tree (QTBTTT) structure from a coding tree unit (CTU) or the largest coding unit (LCU).

For example, one coding unit may be partitioned into a plurality of coding units with a deeper depth based on a quad tree structure, a binary tree structure and/or a ternary structure. In this case, for example, a quad tree structure may be applied first and a binary tree structure and/or a ternary structure may be applied later. Alternatively, a binary tree structure may be applied before a quad tree structure. A coding procedure according to this specification may be performed based on a final coding unit that is no longer partitioned. In this case, based on coding efficiency, etc. according to an image characteristic, the largest coding unit may be directly used as a final coding unit, or if necessary, a coding unit may be recursively partitioned into coding units of a deeper depth, and a coding unit with an optimal size may be used as a final coding unit. Here, a coding procedure may include a procedure such as prediction, transform, and reconstruction, etc. described later.

As another example, the processing unit may further include a prediction unit (PU) or a transform unit (TU). In this case, the prediction unit and the transform unit may be divided or partitioned from a final coding unit described above, respectively. The prediction unit may be a unit of sample prediction, and the transform unit may be a unit for deriving a transform coefficient and/or a unit for deriving a residual signal from a transform coefficient.

In some cases, a unit may be used interchangeably with a term such as a block or an region, etc. In a general case, a M×N block may represent a set of transform coefficients or samples consisting of M columns and N rows. A sample may generally represent a pixel or a pixel value, and may represent only a pixel/a pixel value of a luma component, or only a pixel/a pixel value of a chroma component. A sample may be used as a term that makes one picture (or image) correspond to a pixel or a pel.

An encoding apparatus 200 may subtract a prediction signal (a prediction block, a prediction sample array) output from an inter predictor 221 or an intra predictor 222 from an input image signal (an original block, an original sample array) to generate a residual signal (a residual signal, a residual sample array), and a generated residual signal is transmitted to a transformer 232. In this case, a unit that subtracts a prediction signal (a prediction block, a prediction sample array) from an input image signal (an original block, an original sample array) within an encoding apparatus 200 may be referred to as a subtractor 231.

A predictor 220 may perform prediction on a block to be processed (hereinafter, referred to as a current block) and generate a predicted block including prediction samples for the current block. A predictor 220 may determine whether intra prediction or inter prediction is applied in a unit of a current block or a CU. A predictor 220 may generate various information on prediction such as prediction mode information, etc. and transmit it to an entropy encoder 240 as described later in a description of each prediction mode. Information on prediction may be encoded in an entropy encoder 240 and output in a form of a bitstream.

An intra predictor 222 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. A nondirectional mode may include at least one of a DC mode or a planar mode. A directional mode may include 33 directional modes or 65 directional modes according to a detail level of a prediction direction. However, it is an example, and more or less directional modes may be used according to a configuration. An intra predictor 222 may determine a prediction mode applied to a current block by using a prediction mode applied to a neighboring block.

An inter predictor 221 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. A reference picture including the reference block and a reference picture including the temporal neighboring block may be the same or different. The temporal neighboring block may be referred to as a collocated reference block, a collocated CU (colCU), etc., and a reference picture including the temporal neighboring block may be referred to as a collocated picture (colPic). For example, an inter predictor 221 may configure a motion information candidate list based on neighboring blocks and generate information indicating which candidate is used to derive a motion vector and/or a reference picture index of the current block. Inter prediction may be performed based on various prediction modes, and for example, for a skip mode and a merge mode, an inter predictor 221 may use motion information of a neighboring block as motion information of a current block. For a skip mode, unlike a merge mode, a residual signal may not be transmitted. For a motion vector prediction (MVP) mode, a motion vector of a neighboring block is used as a motion vector predictor and a motion vector difference is signaled to indicate a motion vector of a current block.

A predictor 220 may generate a prediction signal based on various prediction methods described later. For example, a predictor may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, a sample value within a picture may be signaled based on information on a palette table and a palette index. A prediction signal generated through the predictor 220 may be used to generate a reconstructed signal or a residual signal.

A transformer 232 may generate transform coefficients by applying a transform technique to a residual signal. For example, a transform technique may include at least one of Discrete Cosine Transform (DCT), Discrete Sine Transform (DST), Karhunen-Loeve Transform (KLT), Graph-Based Transform (GBT) or Conditionally Non-linear Transform (CNT). Here, GBT refers to transform obtained from this graph when relationship information between pixels is expressed as a graph. CNT refers to transform obtained based on generating a prediction signal by using all previously reconstructed pixels. In addition, a transform process may be applied to a square pixel block in the same size or may be applied to a non-square block in a variable size.

A quantizer 233 may quantize transform coefficients and transmit them to an entropy encoder 240 and an entropy encoder 240 may encode a quantized signal (information on quantized transform coefficients) and output it as a bitstream. Information on the quantized transform coefficients may be referred to as residual information. A quantizer 233 may rearrange quantized transform coefficients in a block form into an one-dimensional vector form based on coefficient scan order, and may generate information on the quantized transform coefficients based on the quantized transform coefficients in the one-dimensional vector form.

An entropy encoder 240 may perform various encoding methods such as exponential Golomb, context-adaptive variable length coding (CAVLC), context-adaptive binary arithmetic coding (CABAC), etc. An entropy encoder 240 may encode information necessary for video/image reconstruction (e.g., a value of syntax elements, etc.) other than quantized transform coefficients together or separately.

Encoded information (ex. encoded video/image information) may be transmitted or stored in a unit of a network abstraction layer (NAL) unit in a bitstream form. The video/image information may further include information on various parameter sets such as an adaptation parameter set (APS), a picture parameter set (PPS), a sequence parameter set (SPS) or a video parameter set (VPS), etc. In addition, the video/image information may further include general constraint information. Herein, information and/or syntax elements transmitted/signaled from an encoding apparatus to a decoding apparatus may be included in video/image information. The video/image information may be encoded through the above-described encoding procedure and included in the bitstream. The bitstream may be transmitted through a network or may be stored in a digital storage medium. Here, a network may include a broadcasting network and/or a communication network, etc. and a digital storage medium may include various storage media such as USB, SD, CD, DVD, Blu-ray, HDD, SSD, etc. A transmission unit (not shown) for transmitting and/or a storage unit (not shown) for storing a signal output from an entropy encoder 240 may be configured as an internal/external element of an encoding apparatus 200, or a transmission unit may be also included in an entropy encoder 240.

Quantized transform coefficients output from a quantizer 233 may be used to generate a prediction signal. For example, a residual signal (a residual block or residual samples) may be reconstructed by applying dequantization and inverse transform to quantized transform coefficients through a dequantizer 234 and an inverse transformer 235. An adder 250 may add a reconstructed residual signal to a prediction signal output from an inter predictor 221 or an intra predictor 222 to generate a reconstructed signal (a reconstructed picture, a reconstructed block, a reconstructed sample array). When there is no residual for a block to be processed like when a skip mode is applied, a predicted block may be used as a reconstructed block. An adder 250 may be referred to as a reconstructor or a reconstructed block generator. A generated reconstructed signal may be used for intra prediction of a next block to be processed within a current picture, and may be also used for inter prediction of a next picture through filtering as described later. Meanwhile, luma mapping with chroma scaling (LMCS) may be applied in a picture encoding and/or reconstruction process.

A filter 260 may improve subjective/objective image quality by applying filtering to a reconstructed signal. For example, a filter 260 may generate a modified reconstructed picture by applying various filtering methods to a reconstructed picture, and may store the modified reconstructed picture in a memory 270, specifically in a DPB of a memory 270. The various filtering methods may include deblocking filtering, sample adaptive offset, adaptive loop filter, bilateral filter, etc. A filter 260 may generate various information on filtering and transmit it to an entropy encoder 240. Information on filtering may be encoded in an entropy encoder 240 and output in a form of a bitstream.

A modified reconstructed picture transmitted to a memory 270 may be used as a reference picture in an inter predictor 221. When inter prediction is applied through it, an encoding apparatus may avoid prediction mismatch in an encoding apparatus 200 and a decoding apparatus, and may also improve encoding efficiency.

A DPB of a memory 270 may store a modified reconstructed picture to use it as a reference picture in an inter predictor 221. A memory 270 may store motion information of a block from which motion information in a current picture is derived (or encoded) and/or motion information of blocks in a pre-reconstructed picture. The stored motion information may be transmitted to an inter predictor 221 to be used as motion information of a spatial neighboring block or motion information of a temporal neighboring block. A memory 270 may store reconstructed samples of reconstructed blocks in a current picture and transmit them to an intra predictor 222.

Figure 3:
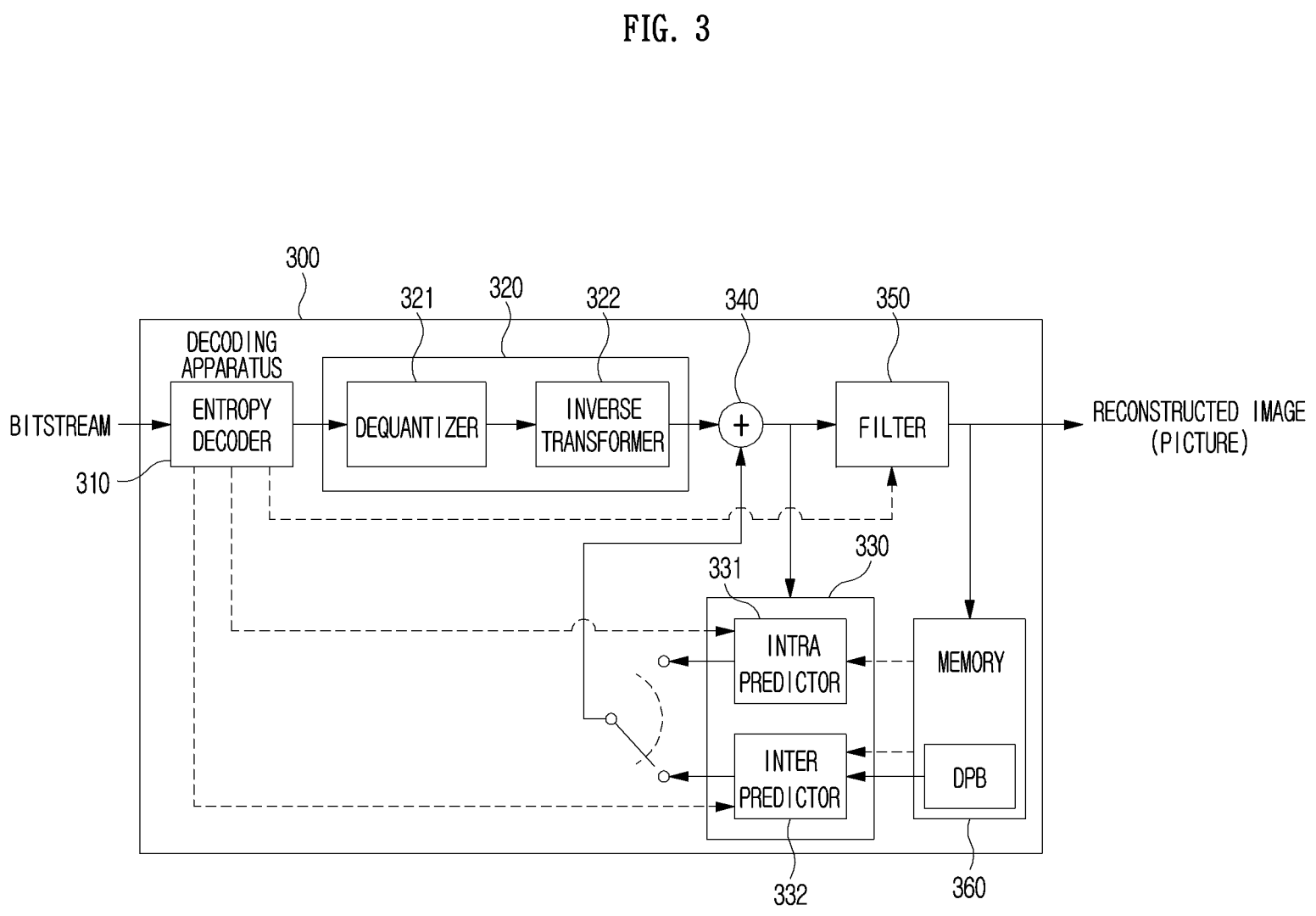

FIG. 3 shows a schematic block diagram of a decoding apparatus to which an embodiment of the present disclosure may be applied and decoding of a video/image signal is performed.

Referring to FIG. 3, a decoding apparatus 300 may be configured by including an entropy decoder 310, a residual processor 320, a predictor 330, an adder 340, a filter 350 and a memory 360. A predictor 330 may include an inter predictor 331 and an intra predictor 332. A residual processor 320 may include a dequantizer 321 and an inverse transformer 321.

According to an embodiment, the above-described entropy decoder 310, residual processor 320, predictor 330, adder 340 and filter 350 may be configured by one hardware component (e.g., a decoding device chipset or a processor). In addition, a memory 360 may include a decoded picture buffer (DPB) and may be configured by a digital storage medium. The hardware component may further include a memory 360 as an internal/external component.

When a bitstream including video/image information is input, a decoding apparatus 300 may reconstruct an image in response to a process in which video/image information is processed in an encoding apparatus of FIG. 2. For example, a decoding apparatus 300 may derive units/blocks based on block partition-related information obtained from the bitstream. A decoding apparatus 300 may perform decoding by using a processing unit applied in an encoding apparatus. Accordingly, a processing unit of decoding may be a coding unit, and a coding unit may be partitioned from a coding tree unit or the target coding unit according to a quad tree structure, a binary tree structure and/or a ternary tree structure. At least one transform unit may be derived from a coding unit. And, a reconstructed image signal decoded and output through a decoding apparatus 300 may be played through a playback device.

A decoding apparatus 300 may receive a signal output from an encoding apparatus of FIG. 2 in a form of a bitstream, and a received signal may be decoded through an entropy decoder 310. For example, an entropy decoder 310 may parse the bitstream to derive information (ex. video/image information) necessary for image reconstruction (or picture reconstruction). The video/image information may further include information on various parameter sets such as an adaptation parameter set (APS), a picture parameter set (PPS), a sequence parameter set (SPS) or a video parameter set (VPS), etc. In addition, the video/image information may further include general constraint information. A decoding apparatus may decode a picture further based on information on the parameter set and/or the general constraint information. Signaled/received information and/or syntax elements described later herein may be decoded through the decoding procedure and obtained from the bitstream. For example, an entropy decoder 310 may decode information in a bitstream based on a coding method such as exponential Golomb encoding, CAVLC, CABAC, etc. and output a value of a syntax element necessary for image reconstruction and quantized values of a transform coefficient regarding a residual. In more detail, a CABAC entropy decoding method may receive a bin corresponding to each syntax element from a bitstream, determine a context model by using syntax element information to be decoded, decoding information of a neighboring block and a block to be decoded or information of a symbol/a bin decoded in a previous step, perform arithmetic decoding of a bin by predicting a probability of occurrence of a bin according to a determined context model and generate a symbol corresponding to a value of each syntax element. In this case, a CABAC entropy decoding method may update a context model by using information on a decoded symbol/bin for a context model of a next symbol/bin after determining a context model. Among information decoded in an entropy decoder 310, information on prediction is provided to a predictor (an inter predictor 332 and an intra predictor 331), and a residual value on which entropy decoding was performed in an entropy decoder 310, i.e., quantized transform coefficients and related parameter information may be input to a residual processor 320. A residual processor 320 may derive a residual signal (a residual block, residual samples, a residual sample array). In addition, information on filtering among information decoded in an entropy decoder 310 may be provided to a filter 350. Meanwhile, a reception unit (not shown) that receives a signal output from an encoding apparatus may be further configured as an internal/external element of a decoding apparatus 300 or a reception unit may be a component of an entropy decoder 310.

Meanwhile, a decoding apparatus according to this specification may be referred to as a video/image/picture decoding apparatus, and the decoding apparatus may be divided into an information decoder (a video/image/picture information decoder) and a sample decoder (a video/image/picture sample decoder). The information decoder may include the entropy decoder 310 and the sample decoder may include at least one of dequantizer 321, the inverse transformer 322, the adder 340, the filter 350, the memory 360, the inter predictor 332 and the intra predictor 331.

A dequantizer 321 may dequantize quantized transform coefficients and output transform coefficients. A dequantizer 321 may rearrange quantized transform coefficients into a two-dimensional block form. In this case, the rearrangement may be performed based on coefficient scan order performed in an encoding apparatus. A dequantizer 321 may perform dequantization on quantized transform coefficients by using a quantization parameter (e.g., quantization step size information) and obtain transform coefficients.

An inverse transformer 322 inversely transforms transform coefficients to obtain a residual signal (a residual block, a residual sample array).

A predictor 320 may perform prediction on a current block and generate a predicted block including prediction samples for the current block. A predictor 320 may determine whether intra prediction or inter prediction is applied to the current block based on the information on prediction output from an entropy decoder 310 and determine a specific intra/inter prediction mode.

A predictor 320 may generate a prediction signal based on various prediction methods described later. For example, a predictor 320 may not only apply intra prediction or inter prediction for prediction for one block, but also may apply intra prediction and inter prediction simultaneously. It may be referred to as a combined inter and intra prediction (CIIP) mode. In addition, a predictor may be based on an intra block copy (IBC) prediction mode or may be based on a palette mode for prediction for a block. The IBC prediction mode or palette mode may be used for content image/video coding of a game, etc. such as screen content coding (SCC), etc. IBC basically performs prediction within a current picture, but it may be performed similarly to inter prediction in that it derives a reference block within a current picture. In other words, IBC may use at least one of inter prediction techniques described herein. A palette mode may be considered as an example of intra coding or intra prediction. When a palette mode is applied, information on a palette table and a palette index may be included in the video/image information and signaled.

An intra predictor 331 may predict a current block by referring to samples within a current picture. The samples referred to may be positioned in the neighborhood of the current block or may be positioned a certain distance away from the current block according to a prediction mode. In intra prediction, prediction modes may include at least one nondirectional mode and a plurality of directional modes. An intra predictor 331 may determine a prediction mode applied to a current block by using a prediction mode applied to a neighboring block.

An inter predictor 332 may derive a prediction block for a current block based on a reference block (a reference sample array) specified by a motion vector on a reference picture. In this case, in order to reduce the amount of motion information transmitted in an inter prediction mode, motion information may be predicted in a unit of a block, a sub-block or a sample based on the correlation of motion information between a neighboring block and a current block. The motion information may include a motion vector and a reference picture index. The motion information may further include inter prediction direction information (L0 prediction, L1 prediction, Bi prediction, etc.). For inter prediction, a neighboring block may include a spatial neighboring block existing in a current picture and a temporal neighboring block existing in a reference picture. For example, an inter predictor 332 may configure a motion information candidate list based on neighboring blocks and derive a motion vector and/or a reference picture index of the current block based on received candidate selection information. Inter prediction may be performed based on various prediction modes, and the information on prediction may include information indicating an inter prediction mode for the current block.

An adder 340 may add an obtained residual signal to a prediction signal (a prediction block, a prediction sample array) output from a predictor (including an inter predictor 332 and/or an intra predictor 331) to generate a reconstructed signal (a reconstructed picture, a reconstructed block, a reconstructed sample array). When there is no residual for a block to be processed like when a skip mode is applied, a prediction block may be used as a reconstructed block.

An adder 340 may be referred to as a reconstructor or a reconstructed block generator. A generated reconstructed signal may be used for intra prediction of a next block to be processed in a current picture, may be output through filtering as described later or may be used for inter prediction of a next picture. Meanwhile, luma mapping with chroma scaling (LMCS) may be applied in a picture decoding process.

A filter 350 may improve subjective/objective image quality by applying filtering to a reconstructed signal. For example, a filter 350 may generate a modified reconstructed picture by applying various filtering methods to a reconstructed picture and transmit the modified reconstructed picture to a memory 360, specifically a DPB of a memory 360. The various filtering methods may include deblocking filtering, sample adaptive offset, adaptive loop filter, bilateral filter, etc.

The (modified) reconstructed picture stored in the DPB of the memory 360 can be used as a reference picture in the inter predictor 332. A memory 360 may store motion information of a block from which motion information in a current picture is derived (or decoded) and/or motion information of blocks in a pre-reconstructed picture. The stored motion information may be transmitted to an inter predictor 260 to be used as motion information of a spatial neighboring block or motion information of a temporal neighboring block. A memory 360 may store reconstructed samples of reconstructed blocks in a current picture and transmit them to an intra predictor 331.

Herein, embodiments described in a filter 260, an inter predictor 221 and an intra predictor 222 of an encoding apparatus 200 may be also applied equally or correspondingly to a filter 350, an inter predictor 332 and an intra predictor 331 of a decoding apparatus 300, respectively.

Figure 4:
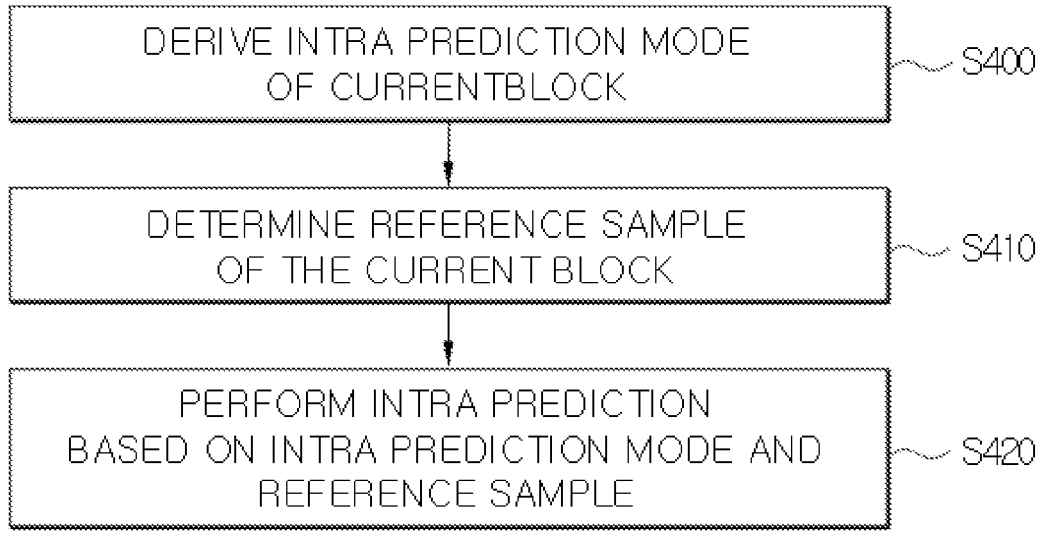
FIG. 4 shows an intra prediction method performed by a decoding device as an embodiment according to the present disclosure.

FIG. 4 shows an intra prediction method performed by a decoding device as an embodiment according to the present disclosure.

Referring to FIG. 4, an intra prediction mode of a current block may be derived S400.

An intra prediction mode of a current block may be derived from intra prediction modes that are pre-defined in a decoding device. The pre-defined intra prediction modes may include a non-directional mode and a directional mode. Here, a non-directional mode may include at least one of a planar mode or a DC mode. An intra prediction mode of a current block may be derived based on a most probable mode (MPM) or may be derived based on a template region of a current block.

MPM-based Derivation Method

According to a MPM-based derivation method, an intra prediction mode of a current block may be derived based on signaled intra prediction mode information. Here, intra prediction mode information includes one or more flags and/or indexes, and based thereon, an intra prediction mode of a current block may be derived.

Intra prediction modes that are pre-defined in a decoding device may be divided into K groups. Here, K may be an integer of 2, 3, 4, or more. Hereinafter, for convenience of a description, it is assumed that the pre-defined intra prediction modes are divided into three groups, and three groups are referred to as a first group to a third group.

A first group may include one or more non-directional modes. A non-directional mode may refer to at least one of a planar mode or a DC mode.

A second group may be referred to as a MPM list, which may include a plurality of most probable modes (MPM). A plurality of MPMs may include at least one of an intra prediction mode, a derived mode, or a default mode of a neighboring block adjacent to a current block.

The neighboring block may include at least one of a left block, a top block, a bottom-left block, a top-right block, or a top-left block. A mode of the neighboring block may be sequentially added to a MPM list according to a priority between the neighboring blocks. Here, a priority may be defined in the order of a left block, a top block, a bottom-left block, a top-right block and a top-left block, or may be defined in the order of a top block, a left block, a bottom-left block, a top-right block and a top-left block. Alternatively, the priority order may be adaptively determined based on a size and/or a shape of a current block. As an example, when a height of a current block is greater than a width, the priority of a top block, a left block, a bottom-left block, a top-right block, and a top-left block may be used. Conversely, when a width of a current block is greater than a height, the priority of a left block, a top block, a bottom-left block, a top-right block, and a top-left block may be used.

The derived mode may be derived by adding or subtracting an offset to or from an intra prediction mode of the neighboring block. Alternatively, the derived mode may be derived by adding or subtracting an offset to or from a default mode described later. Here, an offset may be an integer of 1, 2, 3, 4, or more. The derived mode may be derived based on a neighboring block with a high priority among the above-described neighboring blocks. The derived mode may not be derived based on a neighboring block with a low priority among the above-described neighboring blocks. Here, a neighboring block with a high priority may include at least one of a left block or a top block. Conversely, a neighboring block with a low priority may include at least one of a bottom-left block, a top-right block, or a top-left block. However, when an intra prediction mode of a neighboring block corresponds to a non-directional mode, the derived mode may not be derived based on an intra prediction mode of a corresponding neighboring block.

The default mode may refer to a mode that is pre-defined in a decoding device to configure a MPM list. As an example, a default mode may include at least one of a planar mode, a DC mode, a horizontal mode, a vertical mode, or a diagonal mode. Here, a diagonal mode may refer to one or more of a bottom-left diagonal mode, a top-left diagonal mode, or a top-right diagonal mode.

The second group may be divided into two sub-groups, which will be referred to as a primary MPM list and a secondary MPM list. As an example, when a MPM list consists of N MPMs, M top MPMs belonging to a MPM list may be included in a primary MPM list, and the (N-M) remaining MPMs may be included in a secondary MPM list. In other words, a primary MPM list may include a MPM with an index of 0 to (M-1) belonging to a MPM list. Here, N may refer to the maximum number of MPMs that may be included in a MPM list. M refers to the maximum number of MPMs that may be included in a primary MPM list, and as an example, M may be an integer of 3, 4, 5, 6, or more.

A third group may include the remaining modes that do not belong to a first group and a second group among the pre-defined intra prediction modes.

In the embodiment, a first group is defined as a separate group distinct from a second group, but is not limited thereto. As an example, a first group and a second group may be defined as one group, and in this case, a non-directional mode of a first group may be any one of MPMs included in a MPM list of a second group.

One or more flags may be signaled to specify a group and/or a sub-group to which the same mode as an intra prediction mode of a current block belongs. The flag may include at least one of a first flag indicating whether the same mode as an intra prediction mode of a current block belongs to a first group, a second flag indicating whether the same mode as an intra prediction mode of a current block belongs to a second group (i.e., a MPM list), a third flag indicating whether the same mode as an intra prediction mode of a current block belongs to a primary MPM list, or a fourth flag indicating whether the same mode as an intra prediction mode of a current block belongs to a secondary MPM list.

When a second group is specified by the flag, an index specifying any one of a plurality of MPMs belonging to a second group may be signaled. An intra prediction mode of a current block may be derived based on a MPM specified by the index. Alternatively, when a primary MPM list is specified by the flag, an index specifying any one of a plurality of MPMs belonging to a primary MPM list may be signaled. An intra prediction mode of a current block may be derived based on a MPM specified by the index. Alternatively, when a secondary MPM list is specified by the flag, an index specifying any one of a plurality of MPMs belonging to a secondary MPM list may be signaled. An intra prediction mode of a current block may be derived based on a MPM specified by the index. Likewise, when a first group (or a third group) is specified by the flag, an index specifying any one of a plurality of intra prediction modes belonging to a first group (or a third group) may be signaled separately, and an intra prediction mode of a current block may be derived based on a signaled index. However, when a first group (or a third group) consists of one intra prediction mode, signaling of the index may be omitted.

The above-described flag may be signaled with dependency between flags. As an example, a first flag may be parsed after a second flag is parsed from a bitstream. A first flag may be parsed when a second flag is True. Alternatively, a second flag may be parsed after a first flag is parsed from a bitstream. A second flag may be parsed when a first flag is False. When a second flag is True, a third flag (or a fourth flag) may be parsed from a bitstream, and when a second flag is False, a third flag (or a fourth flag) may not be parsed from a bitstream. Alternatively, a fourth flag may be parsed after a third flag is parsed from a bitstream. A fourth flag may be parsed when a third flag is False.

Template Region-Based Derivation Method

In terms of a decoder, an intra prediction mode may be derived based on a template region adjacent to a current block, which is discussed in detail below.

A cost for each of predetermined candidate modes may be calculated.

The predetermined candidate modes may refer to a plurality of intra prediction modes that are pre-defined equally for an encoding device and a decoding device. Alternatively, for template region-based derivation, a candidate list consisting of the candidate modes may be generated, and a cost may be calculated for candidate modes belonging to the candidate list. Alternatively, a cost may be calculated only for N top candidate modes within the generated candidate list. Here, N may be a value that is pre-defined equally for an encoding device and a decoding device. As an example, N may be an integer of 2, 3, 4, 5 or more.

A candidate list for template region-based derivation may be configured in the same way as a MPM list described above. Alternatively, a candidate list may correspond to the above-described primary MPM list or secondary MPM list. Alternatively, a candidate list may consist of a combination of a first group and a second group (i.e., a MPM list) described above, or may consist of a combination of a sub-group of a first group and a second group (i.e., a primary MPM list or a secondary MPM list).

The cost may be calculated as a sum of absolute difference (SAD) between prediction samples and reconstructed samples in a template region. Alternatively, the cost may be calculated as a sum of absolute transformed difference (SATD) between prediction samples and reconstructed samples in a template region. Here, a SATD may refer to a SAD transformed to a frequency domain. As an example of the transform, Hadamard transform may be used, but is not limited thereto. Prediction samples in a template region may be generated based on a candidate mode described above.

A template region for calculating the cost may be a pre-reconstructed region adjacent to a current block. As an example, the template region may include at least one of a top neighboring region, a left neighboring region, a top-left neighboring region, a bottom-left neighboring region, or a top-right neighboring region.

The template region may be a region that is pre-defined equally for an encoding device and a decoding device for calculating the cost. Alternatively, the template region may be variably determined based on information specifying a position of the template region. In this case, information specifying a position of a template region may be signaled through a bitstream. Alternatively, a position of a template region may be determined based on at least one of whether a current block is positioned on a boundary of a coding tree unit, a size of a current block (e.g., a width, a height, a width to height ratio, a product of a width and a height), a partition type of a current block, a prediction mode of a neighboring region, or the availability of a neighboring region.

As an example, when a current block is positioned at a top boundary of a coding tree unit, at least one of a top neighboring region, a top-left neighboring region or a top-right neighboring region of a current block may not be referred to for calculating a cost. When a width of a current block is greater than a height, any one of a top neighboring region or a left neighboring region (e.g., a top neighboring region) may be referred to for calculating a cost, and the other (e.g., a left neighboring region) may not be referred to for calculating a gradient. Conversely, when a width of a current block is smaller than a height, any one of a top neighboring region or a left neighboring region (e.g., a left neighboring region) may be referred to for calculating a cost, and the other (e.g., a top neighboring region) may not be referred to for calculating a cost. When a current block is generated through horizontal block partition, a top neighboring region may not be referred to for calculating a cost. Conversely, when a current block is generated through vertical block partition, a left neighboring region may not be referred to for calculating a cost. When a neighboring region of a current block is encoded in an inter mode, a corresponding neighboring region may not be referred to for calculating a cost. However, it is not limited thereto, and a corresponding neighboring region may be referred to for calculating a cost regardless of a prediction mode of a neighboring region.

The template region may consist of N reference sample lines. Here, N may be an integer of 1, 2, 3, 4, or more. The number of reference sample lines configuring a template region may be the same regardless of a position of a neighboring region, or may vary depending on a position of a neighboring region. A cost may be calculated based on all samples belonging to the template region. Alternatively, a cost may be calculated by using only a reference sample line at a predetermined position within the template region. Alternatively, a cost may be calculated based on all samples belonging to a reference sample line at the predetermined position, or a cost may be calculated by using only a sample at a predetermined position in a reference sample line at the predetermined position. A position of a reference sample line and/or a sample for calculating the cost may be determined based on at least one of whether a current block is positioned on a boundary of a coding tree unit, a size of a current block (e.g., a width, a height, a width to height ratio, a product of a width and a height), a partition type of a current block, a prediction mode of a neighboring region, or availability of a neighboring region. Alternatively, information indicating a position of a reference sample line for calculating the cost may be signaled through a bitstream.

Among costs calculated for the candidate modes, one candidate mode with the minimum cost may be selected. As an example, a cost for five candidate modes in a candidate list may be calculated, respectively. In the ascending order of calculated costs, five candidate modes in a candidate list may be rearranged. Among five rearranged candidate modes, one top candidate mode may be selected.

Alternatively, at least two candidate modes with the minimum cost among costs calculated for the candidate modes may be selected. As an example, a cost for five candidate modes in a candidate list may be calculated, respectively. In the ascending order of calculated costs, five candidate modes in a candidate list may be rearranged. Among five rearranged candidate modes, two top candidate modes may be selected.

One or more candidate modes selected through the above-described process may be set to an intra prediction mode of a current block.

Alternatively, when at least two candidate modes are selected through the above-described process, an intra prediction mode of a current block may be derived based on comparison between selected candidate modes and/or comparison between at least one of selected candidate modes and a threshold value. As an example, an intra prediction mode of a current block may be derived based on whether selected candidate modes satisfy the following condition.

[Condition] costMode2<(K×costMode1)

In the condition, costMode1 may refer to a cost calculated based on any one of selected candidate modes, and costMode2 may refer to a cost calculated based on another of selected candidate modes. As an example, costMode1 may refer to a cost calculated based on a candidate mode with a smaller cost among selected candidate modes, and costMode2 may refer to a cost calculated based on a candidate mode with a larger cost among selected candidate modes. In the conditions, K represents a predetermined comparison factor, which may be a value that is pre-defined equally for an encoding device and a decoding device. As an example, K may be an integer of 1, 2, or more, or may refer to a real number such as ½ or ¼.

When the condition is satisfied, the selected candidate modes may be set to an intra prediction mode of a current block. On the other hand, when the condition is not satisfied, a candidate mode with a cost of costMode1 may be set to an intra prediction mode of a current block, and a candidate mode with a cost of costMode2 may not be used as an intra prediction mode of a current block.

The above-described template region-based derivation method may be used adaptively based on a predetermined flag (Timd_flag). Here, a flag may indicate whether an intra prediction mode of a current block is derived based on a cost calculated from a template region of a current block. As an example, when the flag is a first value, an intra prediction mode of a current block may be derived through a template region-based derivation method, and when the flag is a second value, an intra prediction mode of a current block may be derived through a MPM-based derivation method.

The flag may be signaled from a bitstream based on at least one of 1) whether a template region-based derivation method is available, 2) whether a luma component of a current block is valid, 3) whether a prediction mode of a current block is an intra mode, 4) whether a component type of a current block is a luma component, 5) whether a size of a current block is larger than a predetermined threshold size, 6) whether a slice to which a current block belongs is slice I, or 7) whether a gradient-based derivation method is applied to a current block.

Whether a template region-based derivation method is available may be determined based on a flag signaled at least one level of a video sequence, a picture, a picture header, or a slice header.

When a current block is a single tree type or a luma block of a dual tree type, it may be determined that a luma component of a current block is valid. On the other hand, when a current block is a chroma block of a dual tree type, it may be determined that a luma component of a current block is invalid. Here, a single tree type may refer to a tree type in which a chroma block of a coding unit has a partition structure that is dependent on a partition structure of a luma block, and a dual tree type may refer to a tree type in which a chroma block of a coding unit has a partition structure that is independent of a luma block.

Even when a current block is a single tree type, when a current block is a chroma block, whether a component type of a current block is a luma component may be determined to be False. On the other hand, even when a current block is a single tree type, when a current block is a luma block, whether a component type of a current block is a luma component may be determined to be True. When a current block is a luma block of a dual tree type, whether a component type of a current block is a luma component may be determined to be True, and when a current block is a chroma block of a dual tree type, whether a component type of a current block may be determined to be False.

In terms of a decoding device, the gradient-based derivation method may refer to a method for deriving an intra prediction mode based on a gradient calculated from a neighboring region of a current block.

As an example, the flag may be signaled as in Table 1 below.

TABLE 1

```
if(sps.useTimd && && Y.valid( ) && predMode = MODE_INTRA
&& isLuma( ) && !(W*H > 1024 && I_SLICE) && !dimd)
    Timd_flag
```

In Table 1, sps.useTimd may indicate whether a template region-based derivation method is available for a video sequence to which a current block belongs. W and H may represent a width and a height of a current block, respectively, and dimd may represent whether a gradient-based derivation method is used. Y.valid( ) may represent whether a luma component is valid for a current block, and predMode may represent a prediction mode of a current block. isLuma( ) may represent whether a component type of a current block is a luma component.

According to Table 1, the flag (Timd_flag) may be signaled from a bitstream when 1) a template region-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is less than 1024, 6) a type of a slice to which a current block belongs is slice I, or 7) a gradient-based derivation method is not applied to a current block.

When a signaled flag is 1, an intra prediction mode of a current block may be derived through a template region-based derivation method, and when the signaled flag is 0, an intra prediction mode of a current block may be derived through a MPM-based derivation method.

Meanwhile, when a condition according to Table 1 is not satisfied, the flag may not be signaled from a bitstream. In this case, the flag may be derived as 0, and an intra prediction mode of a current block may be derived through an MPM-based derivation method.

When a neighboring block of a current block is not available, a template region for calculating a cost can not be configured. In this case, a pre-set initial intra prediction mode may be used as an intra prediction mode of a current block. In this case, a value of a pre-set initial intra prediction mode may be set to 0, which corresponds to a planar mode. In other words, even when a flag parsed according to a condition in Table 1 is 1, when a neighboring block of a current block is not available, a template region-based derivation method is not used, and an intra prediction mode of a current block may be set to a planar mode, which is a pre-set mode.

However, a first MPM in a MPM list according to a MPM-based derivation method described above may be a planar mode. In other words, when a neighboring block of a current block is not available and a flag (Timd_flag) is 1, an intra prediction mode of a current block is a pre-set planar mode, which is the same as a planar mode, a first MPM in a MPM list. Accordingly, it may be unnecessary to signal a flag indicating whether a template region-based derivation method is applied when a neighboring block of a current block is not available. To prevent such unnecessary signaling, when a neighboring block is not available, there may be a limit that a template region-based derivation method is not allowed.

When a neighboring block is not available and a template region for cost calculation is not configured, a decoding device may not calculate a cost from a template region, and further fails to derive an intra prediction mode of a current block. Accordingly, a signaling condition of a flag may be limited to ensure that a template region-based derivation method is not allowed.

The flag may be signaled from a bitstream based on at least one of 1) whether a template region-based derivation method is available, 2) whether a luma component of a current block is valid, 3) whether a prediction mode of a current block is an intra mode, 4) whether a component type of a current block is a luma component, 5) Whether a size of a current block is larger than a predetermined threshold size, 6) Whether a slice to which a current block belongs is slice I, 7) whether a gradient-based derivation method is applied to a current block, or 8) whether a template region of a current block is available.

Conditions 1) to 7) above are the same as described above, and here, an overlapping description is omitted.

When a template region satisfies one or more of the following conditions, a corresponding template region may be determined to be unavailable, and otherwise, a corresponding template region may be determined to be available. As an example, when all neighboring blocks belonging to a template region satisfy one or more of the following conditions, a corresponding template region may be determined to be unavailable, and otherwise, a corresponding template region may be determined to be available. Alternatively, when at least one of neighboring blocks belonging to a template region satisfies one or more of the following conditions, a corresponding template region may be determined to be unavailable, and otherwise, a corresponding template region may be determined to be available.

1) A x-coordinate of a top-left sample in a neighboring block is smaller than 0.

2) A y-coordinate of a top-left sample in a neighboring block is smaller than 0.

3) A x-coordinate of a top-left sample in a neighboring block is equal to or greater than a width of a picture.

4) A y-coordinate of a top-left sample in a neighboring block is equal to or greater than a height of a picture.

5) A neighboring block has later decoding order than a current block.

6) A neighboring block is included in a different slice from a current block.

7) A neighboring block is included in a different tile from a current block.

As an example, the flag may be signaled as in Table 2 below.

TABLE 2

| if(sps.useTimd && Y.valid( ) && predMode == MODE_INTRA && isLuma( ) && !(W*H > 1024 && I_SLICE) && !dimd && isAvailableTemplate( ))<br>    Timd_flag |
|---|

In Table 2, sps.useTimd, Y.valid( ), predMode, and isLuma( ) are the same as described by referring to Table 1, and here, an overlapping description is omitted. In Table 2, isAvailableTemplate( ) may indicate whether a template region is available. When one or more of the above-described conditions are satisfied, isAvailableTemplate( ) may be determined to be 1 (or, True), and otherwise, isAvailableTemplate( ) may be determined to be 0 (or, False).

According to Table 2, the flag (Timd_flag) may be signaled from a bitstream when 1) a gradient-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is less than 1024, 6) a type of a slice to which a current block belongs is slice I, 7) a gradient-based derivation method is not applied to a current block, or 8) a template region of a current block is available.

When a condition according to Table 2 is not satisfied, the flag may not be signaled from a bitstream, and the flag may be driven to 0 (or, False). In this case, an intra prediction mode of a current block may be derived through a MPM-based derivation method described above.

When a neighboring block is not available and a template region for cost calculation is not configured, a decoding device can not calculate a cost from a template region, and further fails to derive an intra prediction mode of a current block. Accordingly, a signaling condition of a flag may be limited to ensure that a template region-based derivation method is not allowed.

TABLE 3

| if(!isAvailableTemplate( ))<br>{<br>    Timd_flag == True;<br>    timd_mode == Planar mode;<br>} |
|---|

In Table 3, isAvailableTemplate( ) may indicate whether a template region is available. According to Table 3, when a template region of a current block is available, a flag (Timd_flag) may be signaled from a bitstream, and otherwise, the flag may not be signaled from a bitstream.

When the flag is not signaled from a bitstream, as in Table 3, a corresponding flag may be derived to True (or, 1). However, an intra prediction mode of a current block may be derived as a mode that is pre-defined equally for an encoding device and a decoding device. Here, a pre-defined mode may be a planar mode. In this way, even when the flag is not signaled from a bitstream and a corresponding flag is derived to 1, there may be a limit that an intra prediction mode of a current block is not derived through a template region-based derivation method.

Alternatively, when a condition according to Table 1 is satisfied, the flag may be signaled through a bitstream. The signaled flag may be updated/changed by considering whether a template region is available.

As an example, the flag (Timd_flag) may be signaled from a bitstream when 1) a template region-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is less than 1024, 6) a type of a slice to which a current block belongs is slice I, or 7) a gradient-based derivation method is not applied to a current block. When a signaled flag is 1, whether a template region of a current block is available may be additionally determined. As a result of the determination, when a template region is available, the signaled flag may be maintained as 1, but otherwise, the signaled flag may be updated/changed to 0. In this case, an intra prediction mode of a current block may be derived as a mode that is pre-defined equally for an encoding device and a decoding device (e.g., a planar mode), or may be derived through a MPM-based derivation method described above.

When a neighboring block is not available and a template region for cost calculation is not configured, a decoding device can not calculate a cost from a template region, and further fails to derive an intra prediction mode of a current block. Accordingly, a signaling condition of a flag may be limited to ensure that a template region-based derivation method is not allowed.

TABLE 4

```
if(!isAvailableTemplate( ))
{
    Timd_flag == True;
    timd_mode == DC mode;
}
```

In Table 4, isAvailableTemplate( ) may indicate whether a template region is available. According to Table 4, when a template region of a current block is available, a flag (Timd_flag) may be signaled from a bitstream, and otherwise, the flag may not be signaled from a bitstream.

When the flag is not signaled from a bitstream, as in Table 4, a corresponding flag may be derived to True (or, 1). However, an intra prediction mode of a current block may be derived as a mode that is pre-defined equally for an encoding device and a decoding device. Here, a pre-defined mode may be a DC mode. In this way, even when the flag is not signaled from a bitstream and a corresponding flag is derived to 1, there may be a limit that an intra prediction mode of a current block is not derived through a template region-based derivation method.

Alternatively, when a condition according to Table 1 is satisfied, the flag may be signaled through a bitstream. The signaled flag may be updated/changed by considering whether a template region is available.

As an example, the flag (Timd_flag) may be signaled from a bitstream when 1) a template region-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is less than 1024, 6) a type of a slice to which a current block belongs is slice I, or 7) a gradient-based derivation method is not applied to a current block. When a signaled flag is 1, whether a template region of a current block is available may be additionally determined. As a result of the determination, when a template region is available, the signaled flag may be maintained as 1, but otherwise, the signaled flag may be updated/changed to 0. In this case, an intra prediction mode of a current block may be derived as a mode that is pre-defined equally for an encoding device and a decoding device (e.g., a DC mode), or may be derived through a MPM-based derivation method described above.

As described above, a flag (Timd_flag) for a current block may be signaled from a bitstream based on at least one of 1) a gradient-based derivation method is available, 2) whether a luma component of a current block is valid, 3) whether a prediction mode of a current block is an intra mode, 4) whether a component type of a current block is a luma component, 5) whether a size of a current block is greater than a predetermined threshold size, 6) whether a slice to which a current block belongs is slice I, or 7) whether a gradient-based derivation method is applied to a current block.

As an example, as in Table 1, when a predetermined condition is satisfied, i.e., when 1) a gradient-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is less than 1024, 6) a type of a slice to which a current block belongs is slice I, or 7) a gradient-based derivation method is not applied to a current block, a flag (Timd_flag) may be signaled from a bitstream.

When a signaled flag is True (or, 1), an initial intra prediction mode of a current block may be set to a mode that is pre-defined equally for an encoding device and a decoding device. An initial intra prediction mode of a current block may be set to a pre-defined mode regardless of whether a template region is available. Here, a pre-defined mode may be a planar mode. However, when a planar mode is used as the pre-defined mode, it may lead to an overlapping result of using a planar mode as a first MPM in a MPM list. Accordingly, a DC mode may be used as the pre-defined mode.

An initial intra prediction mode of the current block may be updated/changed to an intra prediction mode derived through the above-described template region-based derivation method. Specifically, based on a cost for each of one or more intra prediction modes available for a current block, an initial intra prediction mode of a current block may be updated/changed. Here, one or more intra prediction modes available for a current block may refer to candidate modes described above. The initial intra prediction mode of a current block may be updated/changed based on a candidate mode with the minimum cost among costs calculated for the candidate modes.

Referring to FIG. 4, a reference sample of a current block may be determined S410.

A reference sample for intra prediction of a current block may be determined from one or more reference sample lines. A current block may use one reference sample line, or may use at least two reference sample lines.

A reference sample line for intra prediction of a current block may be selected from a plurality of reference sample line candidates that are pre-defined equally for an encoding device and a decoding device. The plurality of pre-defined reference sample line candidates may include at least one of a first reference sample line adjacent to a current block, a second reference sample line 1 sample away from a current block, a third reference sample line 2 samples away from a current block, or a fourth reference sample line 3 samples away from a current block.

To determine a reference sample line of a current block, index information specifying a position of a reference sample line to which a reference sample of a current block belongs may be used. As an example, index information specifying any one of the plurality of reference sample line candidates may be signaled. Alternatively, when two reference sample lines are used for intra prediction of a current block, two index information specifying two reference sample lines among a plurality of reference sample line candidates may be signaled, respectively. Alternatively, as any one of the two reference sample lines is a default reference sample line, signaling of index information therefor may be omitted, and only index information for the other of two reference sample lines may be signaled. Here, a default reference sample line refers to a reference sample line at a pre-defined position equally for an encoding device and a decoding device, and for example, it may be a first reference sample line adjacent to a current block.

Meanwhile, a reference sample line of a current block may be used to determine an intra prediction mode of a current block, and in this case, S410 may be performed before S400.

Referring to FIG. 4, intra prediction of a current block may be performed based on an intra prediction mode and a reference sample of a current block S420.

When an intra prediction mode of a current block is a planar mode, a prediction sample of a current block may be generated through a first prediction sample, a second prediction sample, or a weighted sum of first and second prediction samples. Here, a first prediction sample may be generated through horizontal interpolation. As an example, a first prediction sample may be generated by interpolating a reference sample positioned at a top-right corner of a current block and one or more reference samples positioned on the same horizontal line as a first prediction sample. The second prediction sample may be generated through vertical interpolation. As an example, a second prediction sample may be generated by interpolating a reference sample positioned at a bottom-left corner of a current block and one or more reference samples positioned on the same vertical line as a second prediction sample.

When an intra prediction mode of a current block is a DC mode, an average value of neighboring samples adjacent to a current block may be calculated, and a calculated average value may be configured as all prediction samples in a current block. Here, a neighboring sample may include a top reference sample and a left reference sample of a current block. However, depending on a shape of a current block, an average value may be calculated by using only a top reference sample or a left reference sample.

When an intra prediction mode of a current block is a directional mode, projection may be performed on a reference sample line according to an angle of a corresponding directional mode. When a reference sample exists at a projected position, a corresponding reference sample may be configured as a prediction sample of a current block. When a reference sample does not exist at a projected position, a sample corresponding to a projected position may be generated by using one or more neighboring samples neighboring a projected position. As an example, interpolation may be performed based on two or more neighboring samples neighboring in both directions based on a projected position to generate a sample at a projected position (i.e., a fractional-pel position). Alternatively, any one of a plurality of neighboring samples neighboring a projected position may be configured as a sample at a projected position. In this case, among a plurality of neighboring samples neighboring a projected position, a neighboring sample closest to a projected position may be used. A prediction sample of a current block may be generated based on a sample at a projected position.

A plurality of reference sample lines may be used for intra prediction of a current block, and in this case, a projected position may exist for each reference sample line. In other words, a plurality of samples at a projected position may be determined, and a prediction sample of a current block may be generated based on a weighted sum thereof.

When one intra prediction mode is derived for a current block through a MPM-based derivation method or a template region-based derivation method, intra prediction of a current block may be performed based on a corresponding intra prediction mode.

Alternatively, at least two intra prediction modes may be derived for a current block through a MPM-based derivation method or a template region-based derivation method. In this case, prediction samples of a current block may be generated based on at least two intra prediction modes, and a final prediction sample of a current block may be generated based on a weighted sum of generated prediction samples. Hereinafter, for convenience of a description, it is assumed that two intra prediction modes are derived for a current block, and it will be referred to as a first intra prediction mode and a second intra prediction mode, respectively.

For a current block, a first prediction sample may be generated based on a first intra prediction mode, and a second prediction sample may be generated based on a second intra prediction mode. Based on a weighted sum of the first prediction sample and the second prediction sample, a final prediction sample of a current block may be generated.

When the first and second intra prediction modes are derived through a template region-based derivation method, a weight for the weighted sum may be determined based on at least one of costs calculated based on two intra prediction modes. As an example, a weight applied to a first prediction sample and a second prediction sample may be determined as in Equation 1 below.

$$w1 = costMode2 / (costMode1 + costMode2) \quad \text{[Equation 1]}$$
$$w2 = 1 - w1$$

In Equation 1, w1 may refer to a weight applied to a first prediction sample, and w2 may refer to a weight applied to a second prediction sample. costMode1 may refer to a cost calculated based on a first intra prediction mode, and cost-Mode2 may refer to a cost calculated based on a second intra prediction mode.

When the first and second intra prediction modes are derived through a MPM-based derivation method, a weight for the weighted sum may be determined by considering at least one of a mode value, a position of a group to which a corresponding intra prediction mode belongs, or whether it is a non-directional mode. As an example, when a first intra prediction mode has a smaller mode value than a second intra prediction mode, a greater weight may be applied to a first prediction sample according to a first intra prediction mode. Alternatively, when a group to which a first intra prediction mode belongs is a higher group than a group to which a second intra prediction mode belongs (e.g., when a first intra prediction mode belongs to a first group, and a second intra prediction mode belongs to a second group), a greater weight may be applied to a first prediction sample according to a first intra prediction mode. Alternatively, when a first intra prediction mode is a non-directional mode and a second intra prediction mode is a directional mode, a greater weight may be applied to a first prediction sample according to a first intra prediction mode. When both first and second intra prediction modes are a non-directional mode, the same weight may be applied to a first prediction sample and a second prediction sample, and a greater weight may be applied to a prediction sample corresponding to an intra prediction mode with a smaller mode value between first and second intra prediction modes.

The first intra prediction mode and the second intra prediction mode may share one same reference sample line. Alternatively, a reference sample line may be determined independently for each of first and second intra prediction modes. First and second prediction samples may be generated based on a different reference sample line. In other words, the number/position of reference sample lines used to generate a first prediction sample may be different from the number/position of reference sample line used to generate a second prediction sample.

Meanwhile, prediction samples generated based on the at least two intra prediction modes may be corrected based on a neighboring reconstructed sample of a current block. A final prediction sample of a current block may be generated based on a weighted sum of the corrected prediction samples. A weight for the weighted sum is the same as described above. Hereinafter, a method for correcting prediction samples for each intra prediction mode is described in detail.

When a prediction sample of a current block is generated based on a non-directional mode (e.g., a planar mode, a DC mode), the corrected prediction sample may be generated based on a weighted sum between a prediction sample of a current block and one or more neighboring samples. Here, one or more neighboring samples may include at least one of a top neighboring sample positioned on the same vertical line as the prediction sample or a left neighboring sample positioned on the same horizontal line as the prediction sample. A weight for the weighted sum may be derived based on a position of a prediction sample and a size of a current block. As an example, the weight may be derived as in Equation 2 below.

$$wT[y] = 32 \gg ((y \ll 1) \gg \text{shift}) \qquad \text{[Equation 2]}$$

$$wL[x] = 32 \gg ((x \ll 1) \gg \text{shift})$$

$$\text{shift} = (\text{Log2}(nTbW) + \text{Log2}(nTbH) - 2) \gg 2$$

In Equation 2, wT may refer to a weight applied to a top neighboring sample, and wL may refer to a weight applied to a left neighboring sample, respectively. x and y may represent a coordinate of a prediction sample. Variable shift is a variable for scaling, and may be derived based on a width (nTbW) and a height (nTbH) of a current block.

When a prediction sample of a current block is generated based on a vertical mode, the corrected prediction sample may be generated based on a weighted sum between a prediction sample of a current block and a reference sample.

Here, a reference sample may be determined based on at least one of the amount of change between neighboring samples or a prediction sample. The amount of change may refer to a difference between a left neighboring sample positioned on the same horizontal line as a prediction sample and a pre-defined neighboring sample (e.g., a top-left neighboring sample). As an example, the reference sample may be determined as in Equation 3 below.

$$refL[x][y] = p[-1][y] - p[-1][-1] + predSamples[x][y] \qquad \text{[Equation 3]}$$

In Equation 3, refL may refer to a reference sample, and $p[-1][y]$ and $p[-1][-1]$ may refer to a left neighboring sample positioned on the same horizontal line as a prediction sample and a pre-defined neighboring sample, respectively. predSamples[x][y] may refer to a prediction sample of a (x, y) coordinate in a current block.

A weight for the weighted sum may be derived based on a position of a prediction sample and a size of a current block. As an example, the weight may be derived as in Equation 4 below, which is the same as described in Equation 2.

$$wL[x] = 32 \gg ((x \ll 1) \gg \text{shift}) \qquad \text{[Equation 4]}$$

$$\text{shift} = (\text{Log2}(nTbW) + \text{Log2}(nTbH) - 2) \gg 2$$

When a prediction sample of a current block is generated based on a horizontal mode, the corrected prediction sample may be generated based on a weighted sum between a prediction sample of a current block and a reference sample. Here, a reference sample may be determined based on at least one of the amount of change between neighboring samples or a prediction sample. The amount of change may refer to a difference between a top neighboring sample positioned on the same vertical line as a prediction sample and a pre-defined neighboring sample (e.g., a top-left neighboring sample). As an example, the reference sample may be determined as in Equation 5 below.

$$refT[x][y] = p[x][-1] - p[-1][-1] + predSamples[x][y] \qquad \text{[Equation 5]}$$

In Equation 5, refT refer to a reference sample, and $p[x][-1]$ and $p[-1][-1]$ may refer to a top neighboring sample positioned on the same vertical line as a prediction sample and a pre-defined neighboring sample, respectively. predSamples[x][y] may refer to a prediction sample of a (x, y) coordinate in a current block.

A weight for the weighted sum may be derived based on a position of a prediction sample and a size of a current block. As an example, the weight may be derived as in Equation 6 below, which is the same as described in Equation 2.

$$wT[x] = 32 \gg ((y \ll 1) \gg \text{shift}) \qquad \text{[Equation 6]}$$

$$\text{shift} = (\text{Log2}(nTbW) + \text{Log2}(nTbH) - 2) \gg 2$$

When a prediction sample of a current block is generated based on a directional mode (excluding a vertical mode and a horizontal mode), the corrected prediction sample may be generated based on a weighted sum between a prediction sample of a current block and a reference sample. Here, as described above, a prediction sample is generated based on a sample at a position projected forward according to an angle of the directional mode. The reference sample may refer to a sample at a position projected backward according to an angle of the directional mode. When the position projected backward corresponds to an integer-pel position, a sample at a corresponding position may be configured as a reference sample. When the position projected backward corresponds to a fractional-pel position, a reference sample may be determined based on one or more samples at an integer-pel position adjacent to a corresponding position. In this case, one sample closest to the position projected backward may be configured as a reference sample, or a reference sample at an integer-pel position may be derived through interpolation of a plurality of samples neighboring a position projected backward.

A weight for the weighted sum may be derived based on a position of a prediction sample, an angle of a directional mode, and a size of a current block. It may be derived differently depending on whether a directional mode has vertical directivity. A mode with vertical directivity may refer to a neighboring mode in a vertical mode, and a mode with horizontal directivity may refer to a neighboring mode in a horizontal mode.

As an example, when a directional mode is a mode with vertical directivity, a weight for a weighted sum may be derived as in Equation 7 below $$wL[x] = 32 \gg ((x \ll 1) \gg shift) \qquad \text{[Equation 7]}$$

$$shift = Min(2, Log2(nTbH) - Floor(Log2(3 * invAngle - 2)) + 8)$$

In Equation 7, wL may refer to a weight applied to the reference sample, and x may refer to a x-coordinate of a prediction sample. Variable shift is a variable for scaling, and may be derived based on a height (nTbH) of a current block and an angle (invAngle) of an intra prediction mode of a current block.

Alternatively, when a directional mode is a mode with horizontal directivity, a weight for a weighted sum may be derived as in Equation 8 below.

$$wT[y] = 32 \gg ((y \ll 1) \gg shift) \qquad \text{[Equation 8]}$$

$$shift = Min(2, Log2(nTbW) - Floor(Log2(3 * invAngle - 2)) + 8)$$

In Equation 8, wT may refer to a weight applied to a reference sample, and y may refer to a y-coordinate of a prediction sample. Variable shift is a variable for scaling, and may be derived based on a width (nTbW) of a current block and an angle (invAngle) of an intra prediction mode of a current block.

Correction of the prediction sample may be adaptively performed based on at least one of a size of a current block, a position of a reference sample line of a current block, or an intra prediction mode of a current block. As an example, when at least one of a width or a height of a current block is greater than or equal to a predetermined threshold size, correction of the prediction sample may be performed, and otherwise, correction of the prediction sample may not be performed. Here, a threshold size may be 4, 8, or more.

When a position of a reference sample line of the current block is a position that is pre-defined equally for an encoding device and a decoding device, correction of the prediction sample may be performed, and otherwise, correction of the prediction sample may not be performed. Here, a pre-defined position may correspond to a first reference sample line adjacent to a current block. When an intra prediction mode of the current block is a non-directional mode, or is a directional mode with some mode value among pre-defined directional modes, correction of the prediction sample may be performed, and otherwise, correction of the prediction sample may not be performed. Here, some mode values may include at least one of a mode value greater than or equal to a vertical mode or a mode value less than or equal to a horizontal mode. Alternatively, when an intra prediction mode of the current block is a directional mode, correction of the prediction sample may be performed, and when an intra prediction mode of the current block is a non-directional mode, correction of the prediction sample may not be performed.

Information indicating whether to perform correction of the prediction sample may be signaled through a bitstream. In other words, when the information indicates that correction of a prediction sample is performed, the prediction sample may be corrected through the above-described method, and otherwise, the prediction sample may be configured as a final prediction sample without separate correction.

Figure 5:
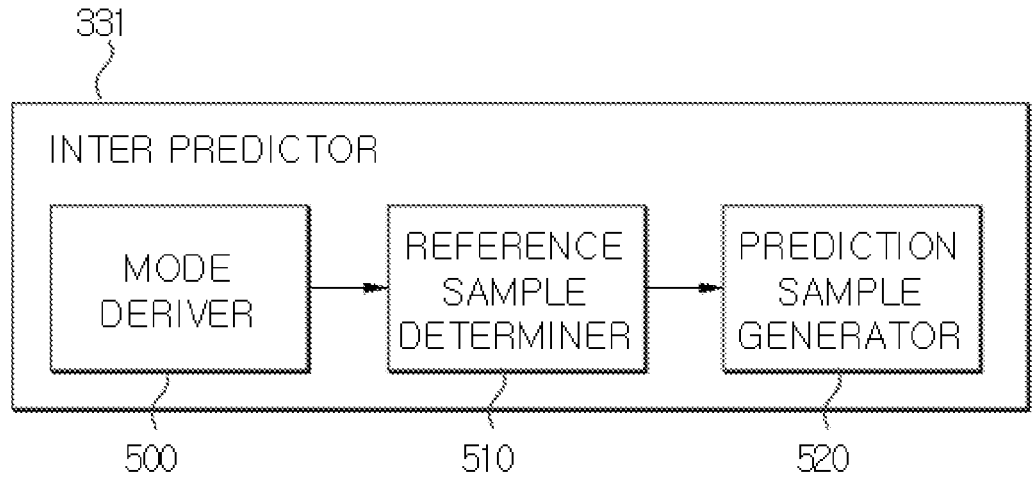
FIG. 5 shows a schematic configuration of an intra predictor 331 that performs an intra prediction method according to the present disclosure.

FIG. 5 shows a schematic configuration of an intra predictor 331 that performs an intra prediction method according to the present disclosure.

Referring to FIG. 5, an intra predictor 331 may include a mode deriver 500, a reference sample determiner 510, and a prediction sample generator 520.

A mode deriver 500 may derive an intra prediction mode of a current block.

An intra prediction mode of a current block may be derived from intra prediction modes that are pre-defined in a decoding device. An intra prediction mode of a current block may be derived based on a MPM or may be derived based on a template region of a current block. It is the same as described by referring to FIG. 4, and here, a detailed description is omitted.

A mode deriver 500 may adaptively use a template region-based derivation method based on a predetermined flag. Here, a flag may indicate whether an intra prediction mode of a current block is derived based on a cost calculated from a template region adjacent to a current block. As described by referring to Table 1 to Table 4, the flag may be signaled from a bitstream when a predetermined condition is satisfied.

When the flag is not signaled, a mode deriver 500 may derive the flag to 0 and derive an intra prediction mode of a current block through a MPM-based derivation method. Alternatively, when the flag is not signaled, a mode deriver 500 may derive the flag to 1 and derive an intra prediction mode of a current block to a mode that is pre-defined equally for an encoding device and a decoding device. Here, a pre-defined mode may be a planar mode or a DC mode.

Alternatively, as in Table 1, even when the flag is signaled because a predetermined condition is satisfied, a mode deriver 500 may update/change the signaled flag by additionally considering whether a template region is available. Furthermore, when the signaled flag is updated/changed to 0, a mode deriver 500 may derive an intra prediction mode of a current block to a mode that is pre-defined equally for an encoding device and a decoding device (e.g., a planar mode or a DC mode) or may derive it through a MPM-based derivation method described above.

Alternatively, even when the flag is signaled because a predetermined condition is satisfied, a mode deriver 500 may set an initial intra prediction mode of a current block as a mode that is pre-defined equally for an encoding device and a decoding device. Here, a pre-defined mode may be a planar mode or a DC mode. Then, a mode deriver 500 may update/change an initial intra prediction mode of the current block based on an intra prediction mode derived through the above-described template region-based derivation method.

A reference sample determiner 510 may determine a reference sample for intra prediction of a current block from one or more reference sample lines. To this end, a reference sample determiner 510 may select one or more reference sample lines from a plurality of reference sample line candidates that are pre-defined equally for an encoding device and a decoding device. Predetermined index information may be used to select a reference sample line, which is the same as described by referring to FIG. 4.

A prediction sample generator 520 may perform intra prediction of a current block based on a reference sample and an intra prediction mode of a current block. A specific intra prediction method is the same as described by referring to FIG. 4, and an overlapping description is omitted here.

Figure 6:
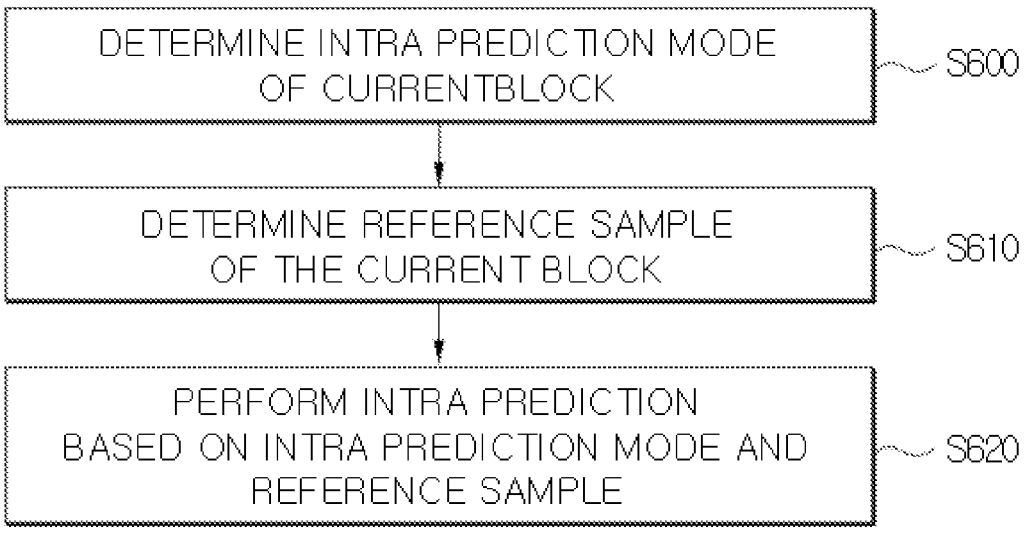
FIG. 6 shows an intra prediction method performed by an encoding device as an embodiment according to the present disclosure.

FIG. 6 shows an intra prediction method performed by an encoding device as an embodiment according to the present disclosure.

Referring to FIG. 6, an intra prediction mode of a current block may be determined S600.

An intra prediction mode of a current block may be determined from intra prediction modes that are pre-defined in an encoding device. An intra prediction mode of a current block may be determined based on a MPM, or may be determined based on a cost of a template region of a current block.

MPM-Based Determination Method

According to a MPM-based determination method, an optimal intra prediction mode for a current block may be determined, and intra prediction mode information for specifying this may be encoded into a bitstream. In this way, it may be distinguished from a template region-based determination method described later in that intra prediction mode information is encoded and transmitted to a decoding device.

Intra prediction modes that are pre-defined in an encoding device may be divided into K groups. Here, K may be an integer of 2, 3, 4, or more. As an example, the pre-defined intra prediction modes may be divided into three groups, and a method for configuring three groups is as described in FIG. 4.

One or more flags may be encoded into a bitstream to specify a group and/or a sub-group to which the same mode as an intra prediction mode of a current block belongs. Here, a flag may include at least one of a first flag indicating whether the same mode as an intra prediction mode of a current block belongs to a first group, a second flag indicating whether the same mode as an intra prediction mode of a current block belongs to a second group (i.e., a MPM list), a third flag indicating whether the same mode as an intra prediction mode of a current block belongs to a primary MPM list, or a fourth flag indicating whether the same mode as an intra prediction mode of a current block belongs to a secondary MPM list.

When an intra prediction mode of a current block belongs to a second group, an index specifying any one of a plurality of MPMs belonging to a second group may be encoded into a bitstream. The index may specify a MPM that is the same as an intra prediction mode of a current block among a plurality of MPMs belonging to a second group. Alternatively, when an intra prediction mode of a current block belongs to a primary MPM list, an index specifying any one of a plurality of MPMs belonging to a primary MPM list may be encoded into a bitstream. The index may specify a MPM that is the same as an intra prediction mode of a current block among a plurality of MPMs belonging to a primary MPM list. Alternatively, when an intra prediction mode of a current block belongs to a secondary MPM list, an index specifying any one of a plurality of MPMs belonging to a secondary MPM list may be encoded into a bitstream. The index may specify a MPM that is the same as an intra prediction mode of a current block among a plurality of MPMs belonging to a secondary MPM list. Similarly, when an intra prediction mode of a current block belongs to a first group (or a third group), an index specifying any one of a plurality of intra prediction modes belonging to a first group (or a third group) may be encoded into a bitstream. The index may specify the same mode as an intra prediction mode of a current block among a plurality of intra prediction modes belonging to a first group (or a third group). However, when a first group (or a third group) consists of one intra prediction mode, encoding of the index may be omitted.

The above-described flag may be encoded with dependency between flags. As an example, a first flag may be encoded after a second flag is encoded into a bitstream. A first flag may be encoded when a second flag is True. Alternatively, a second flag may be encoded after a first flag is encoded into a bitstream. A second flag may be encoded when a first flag is False. When a second flag is True, a third flag (or, a fourth flag) may be encoded into a bitstream, and when a second flag is False, a third flag (or, a fourth flag) may not be encoded into a bitstream. Alternatively, a fourth flag may be encoded after a third flag is encoded into a bitstream. A fourth flag may be encoded when a third flag is False.

Template Region-Based Determination Method

In terms of an encoder, an intra prediction mode may be derived based on a template region adjacent to a current block. In other words, for predetermined candidate modes, a cost of a template region may be calculated. Here, a cost may be calculated as a SAD or a SATD between prediction samples and original samples (or, reconstructed samples) in a template region. One or more candidate modes with the minimum cost among costs calculated for the candidate modes may be selected. Based on the selected one or more candidate modes, an intra prediction mode of a current block may be set. A specific template region-based determination method is the same as described by referring to FIG. 4, and an overlapping description is omitted here.

Whether an intra prediction mode of a current block is determined based on a cost calculated from a template region of a current block may be determined. Based on the determination result, a predetermined flag (Timd_flag) may be encoded into a bitstream. Here, a flag may indicate whether an intra prediction mode of a current block is determined based on a cost calculated from a template region of a current block. As an example, when an intra prediction mode of a current block is determined through a template region-based determination method, the flag may be encoded into a first value, and otherwise, the flag may be encoded into a second value.

However, the flag may be encoded into a bitstream based on at least one of 1) whether a template region-based derivation method is available, 2) whether a luma component of a current block is valid, 3) whether a prediction mode of a current block is an intra mode, 4) whether a component type of a current block is a luma component, 5) whether a size of a current block is larger than a predetermined threshold size, 6) whether a slice to which a current block belongs is slice I, or 7) whether a gradient-based derivation method is applied.

Whether the template region-based derivation method is available may be determined based on a flag encoded at least one level of a video sequence, a picture, a picture header, or a slice header.

When a current block is a luma block in a dual tree type or a single tree type, it may be determined that a luma component of a current block is valid. On the other hand, when a current block is a chroma block in a dual tree type, it may be determined that a luma component of a current block is invalid. Here, a single tree type may refer to a tree type in which a chroma block of a coding unit has a partition structure that is dependent on a partition structure of a luma block, and a dual tree type may refer to a tree type in which a chroma block of a coding unit has a partition structure that is independent of a luma block.

Even when a current block is a single tree type, when a current block is a chroma block, whether a component type of a current block is a luma component may be determined to be False. On the other hand, even when a current block is a single tree type, when a current block is a luma block, whether a component type of a current block is a luma component may be determined to be True. When a current block is a luma block in a dual tree type, whether a component type of a current block is a luma component may be determined to be True, and when a current block is a chroma block in a dual tree type, whether a component type of a current block may be determined to be False.

In terms of an encoding device, the gradient-based derivation method may refer to a method for deriving an intra prediction mode based on a gradient calculated from a neighboring region of a current block.

As an example, as described in Table 1, the flag (Timd_flag) may be encoded into a bitstream when 1) a template region-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is smaller than 1024, 6) a type of a slice to which a current block belongs is slice I, or 7) a gradient-based derivation method is applied to a current block.

In this case, when an intra prediction mode of a current block is determined through a template region-based determination method, the flag may be encoded into 1, and otherwise (e.g., when an intra prediction mode of a current block is determined through a MPM-based determination method), the flag may be encoded into 0.

Meanwhile, when a condition according to Table 1 is not satisfied, the flag may not be encoded into a bitstream. In this case, the flag may be driven to 0, and an intra prediction mode of a current block may be determined through a MPM-based determination method.

When a neighboring block of a current block is not available, a template region for calculating a cost can not be configured. In this case, a pre-set initial intra prediction mode may be used as an intra prediction mode of a current block. In this case, a value of a pre-set initial intra prediction mode may be set to 0, which corresponds to a planar mode.

In other words, even when a flag encoded according to a condition in Table 1 is 1, when a neighboring block of a current block is not available, a template region-based determination method may not be used, and an intra prediction mode of a current block may be set to a planar mode, which is a pre-set mode.

However, a first MPM in a MPM list according to a MPM-based determination method described above may be a planar mode. In other words, when a neighboring block of a current block is not available and a flag (Timd_flag) is encoded into 1, an intra prediction mode of a current block is a pre-set planar mode, which is the same as a planar mode, a first MPM in a MPM list. Accordingly, it may be unnecessary to encode a flag indicating whether a template region-based determination method is applied when a neighboring block of a current block is not available. In order to prevent such unnecessary encoding, when a neighboring block is not available, there may be a limit that a template region-based determination method is not allowed.

When a neighboring block is not available and a template region for cost calculation is not configured, an encoding device may not calculate a cost from a template region, so an intra prediction mode of a current block may not be determined through a template region-based determination method. Accordingly, an encoding condition of a flag may be limited to ensure that a template region-based determination method is not allowed.

The flag may be encoded into a bitstream based on at least one of 1) whether a template region-based derivation method is available, 2) whether a luma component of a current block is valid, 3) whether a prediction mode of a current block is an intra mode, 4) whether a component type of a current block is a luma component, 5) whether a size of a current block is larger than a predetermined threshold size, 6) whether a slice to which a current block belongs is slice I, 7) whether a gradient-based derivation method is applied to a current block, or 8) whether a template region of a current block is available.

Conditions 1) to 7) above are the same as described above, and here, an overlapping description is omitted. When a template region satisfies one or more of the following conditions, a corresponding template region may be determined to be unavailable, and otherwise, a corresponding template region may be determined to be available.

1) A x-coordinate of a top-left sample in a neighboring block is smaller than 0.

2) A y-coordinate of a top-left sample in a neighboring block is smaller than 0.

3) A x-coordinate of a top-left sample in a neighboring block is equal to or greater than a width of a picture.

4) A y-coordinate of a top-left sample in a neighboring block is equal to or greater than a height of a picture.

5) A neighboring block has later decoding order than a current block.

6) A neighboring block is included in a different slice from a current block.

7) A neighboring block is included in a different tile from a current block.

As an example, as described in Table 2, the flag (Timd_flag) may be encoded into a bitstream when 1) a gradient-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is smaller than 1024, 6) a type of a slice to which a current block belongs is slice I, 7) a gradient-based derivation method is not applied to a current block, or 8) a template region of a current block is available.

When a condition according to Table 2 is not satisfied, the flag may not be encoded into a bitstream, and the flag may be derived to 0 (or, False). In this case, an intra prediction mode of a current block may be determined through a MPM-based determination method described above.

When a neighboring block is not available and a template region for cost calculation is not configured, an encoding device may not calculate a cost from a template region, so an intra prediction mode of a current block may not be determined through a template region-based determination method. Accordingly, an encoding condition of a flag may be limited to ensure that a template region-based determination method is not allowed.

As described in Table 3, when a template region of a current block is available, a flag (Timd_flag) may be encoded into a bitstream, and otherwise, the flag may not be encoded into a bitstream.

When the flag is not encoded into a bitstream, as in Table 3, a corresponding flag may be derived to True (or, 1). However, an intra prediction mode of a current block may be derived as a mode that is pre-defined equally for an encoding device and a decoding device. Here, a pre-defined mode may be a planar mode. In this way, even when the flag is not encoded into a bitstream and a corresponding flag is derived to 1, there may be a limit that an intra prediction mode of a current block is not determined through a template region-based determination method.

Alternatively, when a condition according to Table 1 is satisfied, the flag may be encoded into a bitstream. However, considering whether a template region is available, the encoded flag may be updated/changed.

As an example, the flag (Timd_flag) may be encoded into a bitstream when 1) a template region-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is smaller than 1024, 6) a type of a slice to which a current block belongs is slice I, or 7) a gradient-based derivation method is not applied to a current block. When the flag is encoded into 1, whether a template region of a current block is available may be additionally determined. As a result of the determination, when a template region is available, the flag is maintained as 1, but otherwise, the flag may be updated/changed to 0. In this case, an intra prediction mode of a current block may be derived as a mode that is pre-defined equally for an encoding device and a decoding device (e.g., a planar mode) or may be determined through a MPM-based determination method described above.

When a neighboring block is not available and a template region for cost calculation is not configured, an encoding device may not calculate a cost from a template region, so an intra prediction mode of a current block may not be determined through a template region-based determination method. Accordingly, an encoding condition of a flag may be limited to ensure that a template region-based determination method is not allowed.

As described in Table 4, when a neighboring region of a current block is available, a flag (Timd_flag) may be encoded into a bitstream, and otherwise, the flag may not be encoded into a bitstream.

When the flag is not encoded into a bitstream, as in Table 4, a corresponding flag may be derived to True (or, 1). However, an intra prediction mode of a current block may be derived as a mode that is pre-defined equally for an encoding device and a decoding device. Here, a pre-defined mode may be a DC mode. In this way, even when the flag is not encoded into a bitstream and a corresponding flag is derived to 1, there may be a limit that an intra prediction mode of a current block is not determined through a template region-based determination method.

Alternatively, when a condition according to Table 1 is satisfied, the flag may be encoded into a bitstream. However, the encoded flag may be updated/changed by considering whether a template region is available.

As an example, the flag (Timd_flag) may be encoded into a bitstream when 1) a template region-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is smaller than 1024, 6) a type of a slice to which a current block belongs is slice I, or 7) a gradient-based derivation method is not applied to a current block. When the flag is encoded into 1, whether a template region of a current block is available may be additionally determined. As a result of the determination, when a template region is available, the flag is maintained as 1, but otherwise, the flag may be updated/changed to 0. In this case, an intra prediction mode of a current block may be derived as a mode that is pre-defined equally for an encoding device and a decoding device (e.g., a DC mode) or may be determined through a MPM-based determination method described above.

As described above, a flag (Timd_flag) for a current block may be encoded into a bitstream based on at least one of 1) whether a template region-based derivation method is available, 2) whether a luma component of a current block is valid, 3) whether a prediction mode of a current block is an intra mode, 4) whether a component type of a current block is a luma component, 5) whether a size of a current block is larger than a predetermined threshold size, 6) whether a slice to which a current block belongs is slice I, or 7) whether a gradient-based derivation method is applied to a current block.

As an example, as in Table 1, when a predetermined condition is satisfied, i.e., when 1) a gradient-based derivation method is available for a video sequence to which a current block belongs, 2) a luma component is valid for a current block, 3) a prediction mode of a current block is an intra mode, 4) a component type of a current block is a luma component, 5) a product of a width and a height of a current block is smaller than 1024, 6) a type of a slice to which a current block belongs is slice I, or 7) a gradient-based derivation method is not applied to a current block, a flag (Timd_flag) may be encoded into a bitstream.

When the flag is encoded into True (or, 1), an initial intra prediction mode of a current block may be set to a mode that is pre-defined equally for an encoding device and a decoding device. An initial intra prediction mode of a current block may be set to a pre-defined mode regardless of whether a template region is available. Here, a pre-defined mode may be a planar mode. However, when a planar mode is used as the pre-defined mode, it may lead to an overlapping result of using a planar mode as a first MPM in a MPM list. Accordingly, a DC mode may be used as the pre-defined mode.

An initial intra prediction mode of the current block may be updated/changed to an intra prediction mode determined through a template region-based determination method described above.

Referring to FIG. 6, a reference sample of a current block may be determined S610.

A reference sample for intra prediction of a current block may be determined from one or more reference sample lines. A current block may use one reference sample line, or may use at least two reference sample lines.

A reference sample line for intra prediction of a current block may be selected from a plurality of reference sample line candidates that are pre-defined equally for an encoding device and a decoding device. The plurality of pre-defined reference sample line candidates may include at least one of a first reference sample line adjacent to a current block, a second reference sample line 1 sample away from a current block, a third reference sample line 2 samples away from a current block, or a fourth reference sample line 3 samples away from a current block.

Index information specifying a position of a reference sample line to which a reference sample of a current block belongs may be encoded into a bitstream. As an example, index information specifying any one of the plurality of reference sample line candidates may be encoded. Alternatively, when two reference sample lines are used for intra prediction of a current block, two index information specifying two reference sample lines among a plurality of reference sample line candidates may be encoded, respectively. Alternatively, as any one of the two reference sample lines is a default reference sample line, encoding of index information therefor may be omitted, and only index information for the other may be encoded. Here, a default reference sample line refers to a reference sample line at a pre-defined position equally for an encoding device and a decoding device, and for example, it may be a first reference sample line adjacent to a current block.

Meanwhile, a reference sample line of a current block may be used to determine an intra prediction mode of a current block, and in this case, S610 may be performed before S600.

Referring to FIG. 6, a prediction sample of a current block may be generated based on a reference sample and an intra prediction mode of a current block S620.

A method for generating a prediction sample is the same as described by referring to FIG. 4, and a detailed description is omitted here. A residual sample, a difference between a prediction sample and an original sample of a current block, may be generated, and it may be encoded to generate a bitstream.

Meanwhile, a plurality of reference sample lines may be used for intra prediction of a current block, and in this case, a projected position may exist for each reference sample line. In other words, a plurality of samples at a projected position may be determined, and a prediction sample of a current block may be generated based on a weighted sum thereof.

When one intra prediction mode is derived for a current block through a MPM-based derivation method or a template region-based derivation method, intra prediction of a current block may be performed based on a corresponding intra prediction mode. Alternatively, at least two intra prediction modes may be derived for a current block through a MPM-based determination method or a template region-based determination method. A prediction sample corresponding to each of at least two intra prediction modes may be generated, and a prediction sample of a current block may be generated through a weighted sum thereof. It is the same as described by referring to FIG. 4, and here, a detailed description is omitted.

At least two intra prediction modes for a current block may share one same reference sample line. Alternatively, as described above, a reference sample line may be determined independently for each of at least two intra prediction modes.

Alternatively, prediction samples generated based on the at least two intra prediction modes may be corrected based on a neighboring reconstructed sample of a current block. A final prediction sample of a current block may be generated based on a weighted sum of the corrected prediction samples. A specific method for correcting a prediction sample is the same as described by referring to FIG. 4, and an overlapping description is omitted here.

Figure 7:
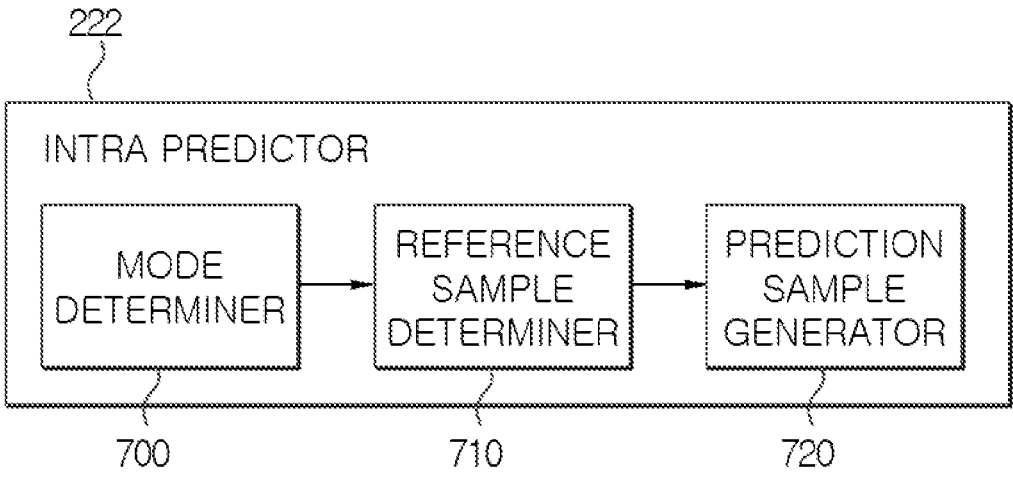
FIG. 7 shows a schematic configuration of an intra predictor 222 that performs an intra prediction method according to the present disclosure.

FIG. 7 shows a schematic configuration of an intra predictor 222 that performs an intra prediction method according to the present disclosure.

Referring to FIG. 7, an intra predictor 222 may include a mode determiner 700, a reference sample determiner 710, and a prediction sample generator 720.

A mode determiner 700 may determine an intra prediction mode of a current block.

An intra prediction mode of a current block may be derived from intra prediction modes that are pre-defined in an encoding device. An intra prediction mode of a current block may be determined based on a MPM or may be derived based on a cost of a template region adjacent to a current block. It is the same as described by referring to FIG. 6, and a detailed description is omitted here.

A mode determiner 700 may determine a predetermined flag (Timd_flag) in order to adaptively use the above-described template region-based determination method. Here, a flag may indicate whether an intra prediction mode of a current block is determined based on a cost calculated from a template region adjacent to a current block. As described by referring to Table 1 to Table 4, a mode determiner 700 may determine the flag and encode it when a predetermined condition is satisfied.

When the flag is not encoded, a mode determiner 700 may derive the flag to 0, and determine an intra prediction mode of a current block through a MPM-based determination method. Alternatively, when the flag is not encoded, a mode determiner 700 may derive the flag to 1, and set an intra prediction mode of a current block to a mode that is pre-defined equally for an encoding device and a decoding device. Here, a pre-defined mode may be a planar mode or a DC mode.

Alternatively, as in Table 1, even when the flag is encoded because a predetermined condition is satisfied, a mode determiner 700 may update/change the encoded flag by additionally considering whether a template region is available. Furthermore, when the encoded flag is updated/changed to 0, a mode determiner 700 may derive an intra prediction mode of a current block to a mode that is pre-defined equally for an encoding device and a decoding device (e.g., a planar mode or a DC mode) or may be determined through a MPM-based determination method described above.

Alternatively, even when the flag is encoded because a predetermined condition is satisfied, a mode determiner 700 may set an initial intra prediction mode of a current block to a mode that is pre-defined equally for an encoding device and a decoding device. Here, a pre-defined mode may be a planar mode or a DC mode. Then, a mode determiner 700 may update/change an initial intra prediction mode of a current block based on an intra prediction mode determined through the above-described template region-based determination method.

A reference sample determiner 710 may determine a reference sample for intra prediction of a current block from one or more reference sample lines. To this end, a reference sample determiner 710 may select one or more reference sample lines from a plurality of reference sample line candidates that are pre-defined equally for an encoding device and a decoding device. Predetermined index information specifying a selected reference sample line may be encoded into a bitstream.

A prediction sample generator 720 may perform intra prediction of a current block based on a reference sample and an intra prediction mode of a current block. A specific intra prediction method is the same as described by referring to FIG. 6, and an overlapping description is omitted here.

In the above-described embodiment, methods are described based on a flowchart as a series of steps or blocks, but a corresponding embodiment is not limited to the order of steps, and some steps may occur simultaneously or in different order with other steps as described above. In addition, those skilled in the art may understand that steps shown in a flowchart are not exclusive, and that other steps may be included or one or more steps in a flowchart may be deleted without affecting the scope of embodiments of the present disclosure.

The above-described method according to embodiments of the present disclosure may be implemented in a form of software, and an encoding apparatus and/or a decoding apparatus according to the present disclosure may be included in a device which performs image processing such as a TV, a computer, a smartphone, a set top box, a display device, etc.

In the present disclosure, when embodiments are implemented as software, the above-described method may be implemented as a module (a process, a function, etc.) that performs the above-described function. A module may be stored in a memory and may be executed by a processor. A memory may be internal or external to a processor, and may be connected to a processor by a variety of well-known means. A processor may include an application-specific integrated circuit (ASIC), another chipset, a logic circuit and/or a data processing device. A memory may include a read-only memory (ROM), a random access memory (RAM), a flash memory, a memory card, a storage medium and/or another storage device. In other words, embodiments described herein may be performed by being implemented on a processor, a microprocessor, a controller or a chip. For example, functional units shown in each drawing may be performed by being implemented on a computer, a processor, a microprocessor, a controller or a chip. In this case, information for implementation (ex. information on instructions) or an algorithm may be stored in a digital storage medium.

In addition, a decoding apparatus and an encoding apparatus to which embodiment(s) of the present disclosure are applied may be included in a multimedia broadcasting transmission and reception device, a mobile communication terminal, a home cinema video device, a digital cinema video device, a surveillance camera, a video conversation device, a real-time communication device like a video communication, a mobile streaming device, a storage medium, a camcorder, a device for providing video on demand (VoD) service, an over the top video (OTT) device, a device for providing Internet streaming service, a three-dimensional (3D) video device, a virtual reality (VR) device, an argumente reality (AR) device, a video phone video device, a transportation terminal (ex. a vehicle (including an autonomous vehicle) terminal, an airplane terminal, a ship terminal, etc.) and a medical video device, etc., and may be used to process a video signal or a data signal. For example, an over the top video (OTT) device may include a game console, a blu-ray player, an Internet-connected TV, a home theater system, a smartphone, a tablet PC, a digital video recorder (DVR), etc.

In addition, a processing method to which embodiment(s) of the present disclosure are applied may be produced in a form of a program executed by a computer and may be stored in a computer-readable recording medium. Multimedia data having a data structure according to embodiment(s) of the present disclosure may be also stored in a computer-readable recording medium. The computer-readable recording medium includes all types of storage devices and distributed storage devices that store computer-readable data. The computer-readable recording medium may include, for example, a blu-ray disk (BD), an universal serial bus (USB), ROM, PROM, EPROM, EEPROM, RAM, CD-ROM, a magnetic tape, a floppy disk and an optical media storage device. In addition, the computer-readable recording medium includes media implemented in a form of a carrier wave (e.g., transmission via the Internet). In addition, a bitstream generated by an encoding method may be stored in a computer-readable recording medium or may be transmitted through a wired or wireless communication network.

In addition, embodiment(s) of the present disclosure may be implemented by a computer program product by a program code, and the program code may be executed on a computer by embodiment(s) of the present disclosure. The program code may be stored on a computer-readable carrier.

Figure 8:
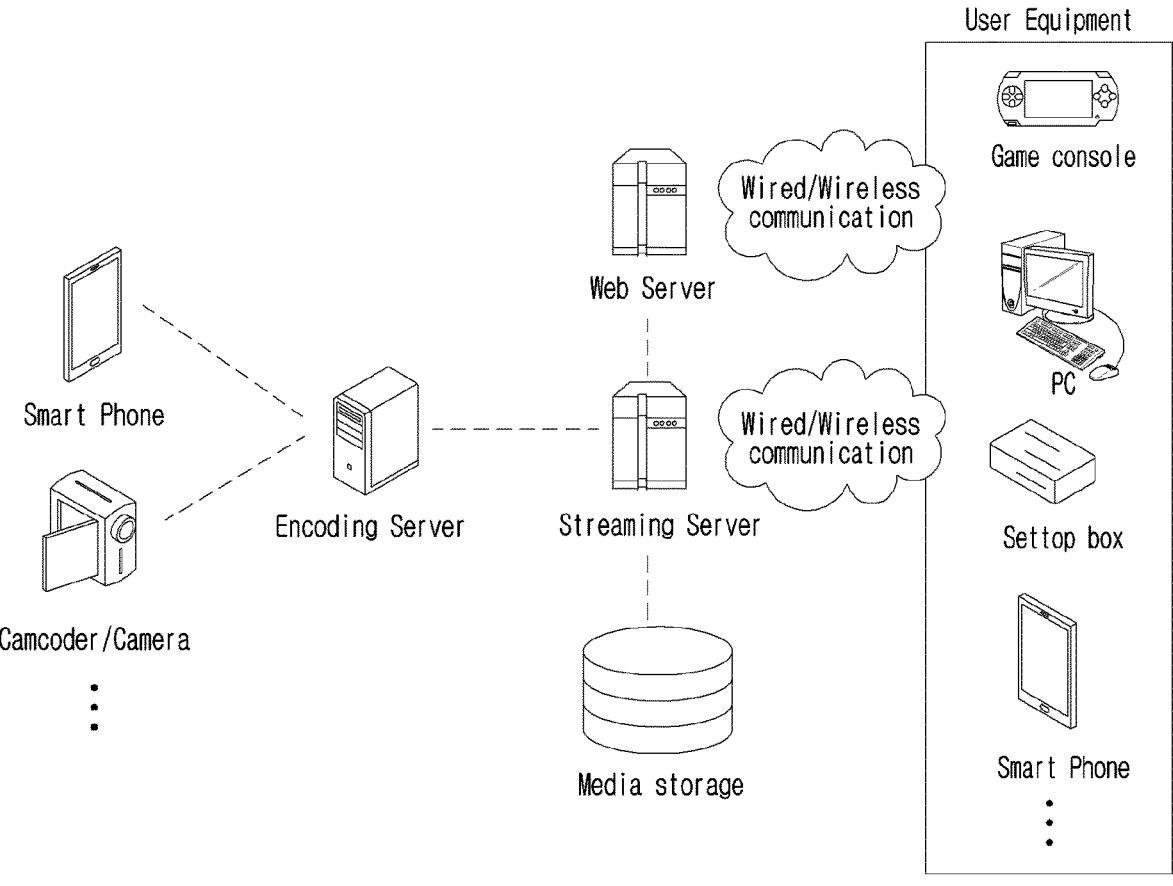
FIG. 8 shows an example of a contents streaming system to which embodiments of the present disclosure may be applied.

FIG. 8 shows an example of a contents streaming system to which embodiments of the present disclosure may be applied.

Referring to FIG. 8, a contents streaming system to which embodiment(s) of the present disclosure are applied may largely include an encoding server, a streaming server, a web server, a media storage, a user device and a multimedia input device.

The encoding server generates a bitstream by compressing contents input from multimedia input devices such as a smartphone, a camera, a camcorder, etc. into digital data and transmits it to the streaming server. As another example, when multimedia input devices such as a smartphone, a camera, a camcorder, etc. directly generate a bitstream, the encoding server may be omitted.

The bitstream may be generated by an encoding method or a bitstream generation method to which embodiment(s) of the present disclosure are applied, and the streaming server may temporarily store the bitstream in a process of transmitting or receiving the bitstream.

The streaming server transmits multimedia data to a user device based on a user's request through a web server, and the web server serves as a medium to inform a user of what service is available. When a user requests desired service from the web server, the web server delivers it to a streaming server, and the streaming server transmits multimedia data to a user. In this case, the contents streaming system may include a separate control server, and in this case, the control server controls a command/a response between each device in the content streaming system.

The streaming server may receive contents from a media storage and/or an encoding server. For example, when contents is received from the encoding server, the contents may be received in real time. In this case, in order to provide smooth streaming service, the streaming server may store the bitstream for a certain period of time.

An example of the user device may include a mobile phone, a smart phone, a laptop computer, a digital broadcasting terminal, a personal digital assistants (PDAs), a portable multimedia players (PMP), a navigation, a slate PC, a Tablet PC, an ultrabook, a wearable device (e.g., a smartwatch, a smart glass, a head mounted display (HMD), a digital TV, a desktop, a digital signage, etc.

Each server in the contents streaming system may be operated as a distributed server, and in this case, data received from each server may be distributed and processed.

The claims set forth herein may be combined in various ways. For example, a technical characteristic of a method claim of the present disclosure may be combined and implemented as a device, and a technical characteristic of a device claim of the present disclosure may be combined and implemented as a method. In addition, a technical characteristic of a method claim of the present disclosure and a technical characteristic of a device claim may be combined and implemented as a device, and a technical characteristic of a method claim of the present disclosure and a technical characteristic of a device claim may be combined and implemented as a method.

The invention claimed is:

1. An image decoding method, comprising:

deriving an intra prediction mode of a current block based on a flag of the current block, the flag indicating whether the intra prediction mode of the current block is derived based on a template region of the current block;

determining a reference sample of the current block; and generating a prediction sample of the current block based on the intra prediction mode and the reference sample, wherein based on the template region of the current block being available, the flag is signaled from a bitstream, and wherein based on the template region of the current block not being available, the flag is not signaled from the bitstream and is derived as 1.

2. The method of claim 1, wherein based on the flag being derived as 1, the intra prediction mode of the current block is set to a planar mode.

3. The method of claim 1, wherein based on the flag being derived as 1, the intra prediction mode of the current block is set to a DC mode.

4. An image encoding method, comprising:

determining whether an intra prediction mode of a current block is determined based on a template region of the current block;

determining the intra prediction mode of the current block based on the determination;

determining a reference sample of the current block; and generating a prediction sample of the current block based on the intra prediction mode and the reference sample, wherein a flag indicating whether the intra prediction mode of the current block is determined based on the template region is encoded into a bitstream based on whether the template region of the current block is available, wherein based on the template region of the current block being available, the flag is encoded into the bitstream, and wherein based on the template region of the current block not being available, the flag is not encoded into the bitstream and is derived as 1.

5. A transmitting data for an image, comprising:

generating a bitstream for the image, wherein the bitstream is generated based on determining whether an intra prediction mode of a current block is determined based on a template region of the current block, determining the intra prediction mode of the current block based on the determination, determining a reference sample of the current block, and generating a prediction sample of the current block based on the intra prediction mode and the reference sample; and transmitting the data including the bitstream, wherein a flag indicating whether the intra prediction mode of the current block is determined based on the template region is encoded into the bitstream based on whether the template region of the current block is available, wherein based on the template region of the current block being available, the flag is encoded into the bitstream, and wherein based on the template region of the current block not being available, the flag is not encoded into the bitstream and is derived as 1.

* * * * *